US009606991B2

(12) United States Patent
Sano et al.

(10) Patent No.: US 9,606,991 B2
(45) Date of Patent: Mar. 28, 2017

(54) COMMENT DISTRIBUTION SYSTEM, AND A METHOD AND A PROGRAM FOR OPERATING THE COMMENT DISTRIBUTION SYSTEM

(71) Applicant: Dwango Co., Ltd., Tokyo (JP)

(72) Inventors: Masaki Sano, Tokyo (JP); Akihiko Koizuka, Tokyo (JP); Hajime Hoshi, Tokyo (JP); Kenchi Miyazaki, Tokyo (JP)

(73) Assignee: DWANGO Co., Ltd. (JP)

( * ) Notice: Subject to any disclaimer, the term of this patent is extended or adjusted under 35 U.S.C. 154(b) by 258 days.

(21) Appl. No.: 13/668,727

(22) Filed: Nov. 5, 2012

(65) Prior Publication Data

US 2013/0318099 A1 Nov. 28, 2013

Related U.S. Application Data

(60) Provisional application No. 61/651,667, filed on May 25, 2012.

(51) Int. Cl.
*G06F 7/00* (2006.01)
*G06F 17/30* (2006.01)
(Continued)

(52) U.S. Cl.
CPC .. *G06F 17/30017* (2013.01); *G06F 17/30882* (2013.01); *H04N 21/25866* (2013.01);
(Continued)

(58) Field of Classification Search
CPC ......... G06F 17/30017; G06F 17/30837; G06F 17/30817; G06F 17/30864
(Continued)

(56) References Cited

U.S. PATENT DOCUMENTS

| | | | | |
|---|---|---|---|---|
| 8,364,671 | B1 * | 1/2013 | Sinton et al. | 707/728 |
| 2007/0115256 | A1 * | 5/2007 | Lee et al. | 345/156 |

(Continued)

FOREIGN PATENT DOCUMENTS

| | | | |
|---|---|---|---|
| JP | 2001-092750 | A | 4/2001 |
| JP | 2007-233874 | A | 9/2007 |
| JP | 2008-172745 | A | 7/2008 |

OTHER PUBLICATIONS

Japanese Office action for Application No. 2011-096088 dated Apr. 10, 2013.

*Primary Examiner* — James Trujillo
*Assistant Examiner* — John J Morris
(74) *Attorney, Agent, or Firm* — Harness, Dickey & Pierce, P.L.C.

(57) ABSTRACT

In the conventional technology, a flag, which is for processing non-display of a certain comment according to existence or number of counts of deletion requests, is given to the comment in server side and distributed to the respective terminals. Therefore, there is a deficiency that comments with flags are not displayed in all users' terminals without exception. In order to solve the above deficiency, the present invention provides a comment distribution system, where a score is given to a comment to be distributed, the score is reduced in the distribution server according to registrations of inappropriate word from users as viewers, and a threshold is given with respect to each reproduction terminal and the score and the threshold are compared, thereby determining whether the comment is reproduced.

23 Claims, 30 Drawing Sheets

(51) Int. Cl.

| | |
|---|---|
| *H04N 21/258* | (2011.01) |
| *H04N 21/454* | (2011.01) |
| *H04N 21/488* | (2011.01) |
| *H04N 21/6547* | (2011.01) |
| *H04N 21/6587* | (2011.01) |
| *H04N 21/81* | (2011.01) |
| *H04N 21/84* | (2011.01) |
| *H04N 21/485* | (2011.01) |

(52) U.S. Cl.
CPC ......... *H04N 21/454* (2013.01); *H04N 21/488* (2013.01); *H04N 21/6547* (2013.01); *H04N 21/6587* (2013.01); *H04N 21/8126* (2013.01); *H04N 21/84* (2013.01); *H04N 21/485* (2013.01)

(58) Field of Classification Search
USPC ................. 707/748, 752, 728, 770, 999.107; 709/203; 386/230
See application file for complete search history.

(56) References Cited

U.S. PATENT DOCUMENTS

| | | | | |
|---|---|---|---|---|
| 2009/0070376 | A1* | 3/2009 | Eom et al. | 707/104.1 |
| 2010/0121912 | A1* | 5/2010 | Kawakami et al. | 709/203 |
| 2010/0169786 | A1* | 7/2010 | O'Brien et al. | 715/738 |
| 2011/0040787 | A1* | 2/2011 | Cierniak et al. | 707/770 |
| 2012/0158753 | A1* | 6/2012 | He et al. | 707/752 |
| 2013/0004138 | A1* | 1/2013 | Kilar et al. | 386/230 |
| 2013/0204833 | A1* | 8/2013 | Pang | G06Q 30/02 706/52 |

* cited by examiner a)

```
＜Info＞
    ＜Comment_ID＞ Com_002 ＜/Comment_ID＞
    ＜Comment＞ You must die, pitcher. ＜/Comment＞
    ＜User_ID＞ Yakyu_suki ＜/User_ID＞
    ＜Score＞ 80 ＜/Score＞
              .
              .
              .
＜/Info＞
```

Fig.5

| Comment ID | Movie ID | User ID | Content of comment | Reproduction timing | Score |
|---|---|---|---|---|---|
| Com_001 | HvsM | GoGoHawk | We want a homerun. | 0:13:01 | 100 |
| Com_002 | HvsM | Yakyu_suki | You must die, pitcher. | 0:13:04 | 80 |
| Com_003 | HvsM | Dragons | Come on! | 0:13:02 | 100 |
| Com_004 | HvsM | Homerun | Go for it. | 0:13:00 | 100 |
| ⋮ | ⋮ | ⋮ | ⋮ | ⋮ | ⋮ |

Fig.23

| User ID | User classification ID | User score |
|---|---|---|
| GoGoHawk | Senior member | 100 |
| Yakyu_suki | General member | 80 |
| Dragons | General member | 100 |
| Homerun | Senior member | 100 |
| ⋮ | ⋮ | ⋮ | a)

Fig.27

(Movie ID:HvsM)

| User ID | User score |
|---|---|
| GoGoHawk | 100 |
| Yakyu_suki | 50 |
| Dragons | 80 |
| Homerun | 100 |
| . . . | . . . |

(Movie ID:12dCE)

| User ID | User score |
|---|---|
| Yakyu_suki | 100 |
| Hophip | 80 |
| WWaltz | 90 |
| . . . | . . . |

COMMENT DISTRIBUTION SYSTEM, AND A METHOD AND A PROGRAM FOR OPERATING THE COMMENT DISTRIBUTION SYSTEM

BACKGROUND OF THE INVENTION

Field of the Invention

The present invention relates to a technology for display control of an entered comment to be displayed by interlocking with a movie.

Description of the Related Art

Conventionally, in the service for distributing a movie from a movie distribution server to a large number of reproduction terminals, a movie distribution system capable of displaying comments, which users have entered for the distributed movie, by interlocking with the movie, has been provided. For example, this makes it possible to share an impression of a scene in the movie through display of comments by interlocking with the scene between users, thereby providing the users with experience of viewing the movie with communication.

However, when any user can enter a comment, a comment such as a libelous comment from a malicious user and repeatedly entered unknown comments, which makes a general user unpleasant in some situations, can be entered.

In Japanese Patesnt No. 4263218, a comment distribution server has a function of receiving a request for deleting a comment from a movie/comment reproduction terminal, and of adding a non-display flag to the comment as a target of the request, thereby preventing from displaying the comment on the terminal. Moreover, it is disclosed that the number of deletion request is counted with respect to each comment, thereby not displaying a comment having a predetermined number of deletion requests.

Thus, it is possible to not display the comment, which makes a specific user or a plurality of users unpleasant in some situations, on the reproduction terminal of each user.

RELATED ART DOCUMENTS

Patent Document 1: Japanese Patent No. 4263218

Meanwhile, in Japanese Patent No. 4263218, the non-display flag according to the deletion request for a comment or to the number of counts is added to the comment in the server, and is distributed to the respective terminals. Therefore, the comment with flag is not displayed in all users' terminals without exception.

There is a case that user's feelings for the comment can be different. For example, a user feels unpleasant for a comment, but another user does not care or rather favors the comment due to his thought.

However, in Japanese Patent No. 4263218, the predetermined comment is not displayed in all users' terminals without exception, so that it is difficult to handle the different type of users.

SUMMARY OF THE INVENTION

In order to solve the above deficiency, the present invention provides a comment distribution system, where a score is given to a comment to be distributed, the score is reduced in the distribution server according to a registration of an inappropriate word from a user as a viewer, a threshold is given with respect to each reproduction terminal, and the score and the threshold are compared, thereby determining whether the comment is to be reproduced.

Specifically, an aspect of the present invention provides a comment distribution system, comprising a reproduction terminal for a user; and a distribution server, distributing comment information with score, that can be reproduced by interlocking with movie information to be reproduced, to the reproduction terminal, wherein the reproduction terminal further comprises, an inappropriate word registration unit, registering the comment, reproduced on a basis of the comment information, as an inappropriate word according to a designation by the user as a viewer, an inappropriate word notification unit, notifying the distribution server of the registration of the inappropriate word, a score acquisition unit, acquiring the score added to the comment information distributed from the distribution server, and a determination unit, determining whether the comment is to be reproduced by interlocking with the movie information according to the acquired score, and wherein the distribution server further comprises, an inappropriate word receiver, receiving the inappropriate word, a calculation unit, reducing the score added to the comment information corresponding to the inappropriate word notification, and a comment information distribution unit, distributing the comment information with score.

Moreover, in another aspect of the present invention, the comment distribution unit reduces the score of the comment of the inappropriate user according to an inappropriate user registration by a user as a viewer.

Specifically, another aspect of the present invention provides a comment distribution system, comprising a reproduction terminal for a user; and a distribution server, distributing comment information with score, that can be reproduced by interlocking with movie information to be reproduced, to the reproduction terminal, wherein the reproduction terminal further comprises, an inappropriate comment user registration unit, registering a user ID of a comment user as an inappropriate comment user according to a designation by the user as a viewer, an inappropriate comment user notification unit, notifying the distribution server of the registration of a user ID of the inappropriate comment user, a score acquisition unit, acquiring the score added to the comment information distributed from the distribution server, and a second determination unit, determining whether the comment is to be reproduced by interlocking with the movie information according to the acquired score, and wherein the distribution server further comprises, an inappropriate comment user ID receiver, receiving the user ID of the inappropriate comment user, a second calculation unit, reducing the score added to the comment information corresponding to the notification of the user ID of the inappropriate comment user, and a comment information distribution unit, distributing the comment information with score.

Moreover, in another aspect of the present invention, a comment distribution system manages the user ID for identifying the user with a user score, sets a score (initial value at entering) of a comment on the basis of the user score, and reduces the user score of the user in response to the inappropriate comment user registration.

According to the present invention having the above configuration, it is possible to compare the score, which is added to the respective comments, and is reduced according to the inappropriate word registration or the inappropriate comment user registration by a viewer user, with the threshold set with respect to each reproduction terminal, thereby determining display/non-display of the comment by the reproduction terminal.

BRIEF DESCRIPTION OF THE DRAWINGS

FIG. 4 is a diagram exemplifying score acquisition by the score acquisition unit of the comment distribution system of the first embodiment.

FIG. 5 is a diagram exemplifying a database of the comment information referred upon distribution of the comment information of the comment distribution system of the first embodiment.

FIG. 23 is an illustration of a table data stored in a user classification storage of the comment distribution system of the eighth embodiment.

FIG. 27 is an illustration of storing user score with respect to each movie in the comment distribution system of the ninth embodiment.

DESCRIPTION OF THE PREFERRED EMBODIMENTS

Hereinafter, embodiments of the present invention will be described with reference to diagrams. The present invention is not to be limited to the above embodiments and able to be embodied in various forms without departing from the scope thereof.

Embodiments of the present invention will be described hereinafter. Relationships between the embodiments and claims are as follows. The first embodiment will mainly describe Claims 1, 3, 12 to 15. The second embodiment will mainly describe Claim 2. The third embodiment will mainly describe Claim 4. The fourth embodiment will mainly describe Claim 7. The fifth embodiment will mainly describe Claim 8. The sixth embodiment will mainly describe Claim 9. The seventh embodiment will mainly describe Claim 10. The eighth embodiment will mainly describe Claim 11. The ninth embodiment will mainly describe Claim 5. The tenth embodiment will mainly describe Claim 6.

First Embodiment

Outline of First Embodiment

Figure 1:
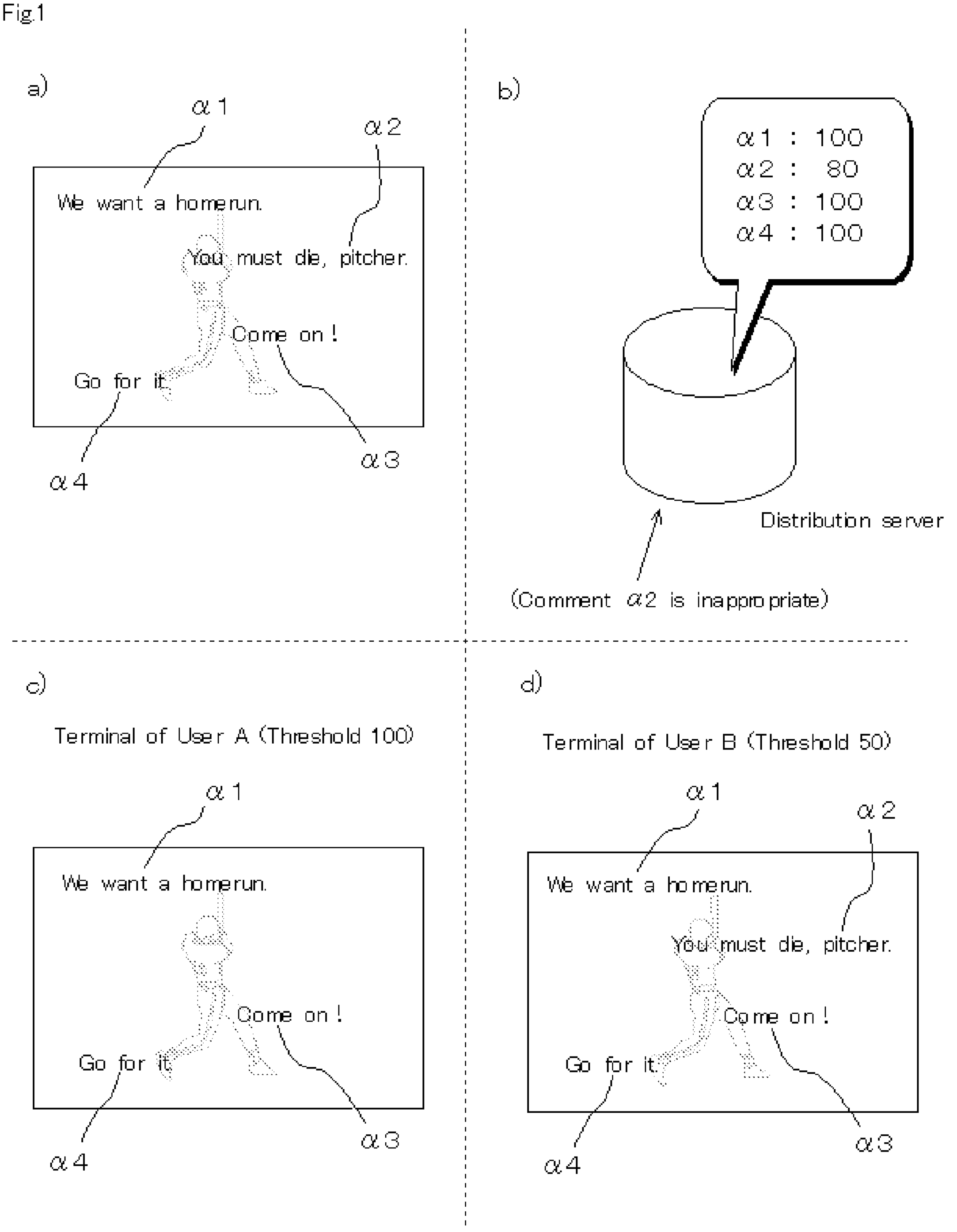
FIG. 1 is a conceptual diagram exemplifying a processing for display/non-display of a comment by a user terminal of a distribution system of a first embodiment.

FIG. 1 is a conceptual diagram of exemplifying a processing for display/non-display of a comment by a user terminal of a distribution system of a first embodiment.

As shown in FIG. 1 (*a*), comments α 1 to α 4 with scores, which have been entered by users, are displayed by interlocking with the distributed movie. However, the comment α 2 has been regarded as an improper comment for the movie, and registered as an inappropriate comment by many users.

Then, as shown in FIG. 1 (*b*), the inappropriate comment registration information is notified to the comment distribution sever, thereby recalculating the score added to the comment according to the registration. Subsequently, upon distributing the move, the comments α 1 to α 4, including the comment α 2 with the recalculated score '80' are distributed.

Subsequently, as shown in FIG. 1 (*c*), the threshold for comment display in the reproduction terminal of the user A is set to '100', so that the comment α 2 is not displayed on this reproduction terminal. Meanwhile, the user B desires to view various comments regardless of adequateness of a comment, and sets the threshold to '50' in the reproduction terminal. Accordingly, as shown in FIG. 1 (*d*), in the reproduction terminal of this user B, comments including the comment α 2 are displayed.

As described above, in the comment distribution system of the first embodiment, the score added to the respective comments is reduced according to the inappropriate word registration by the user, thereby executing display/non-display of the comment on the reproduction terminal with respect to each reproduction terminal.

Functional Configuration of First Embodiment

Figure 2:
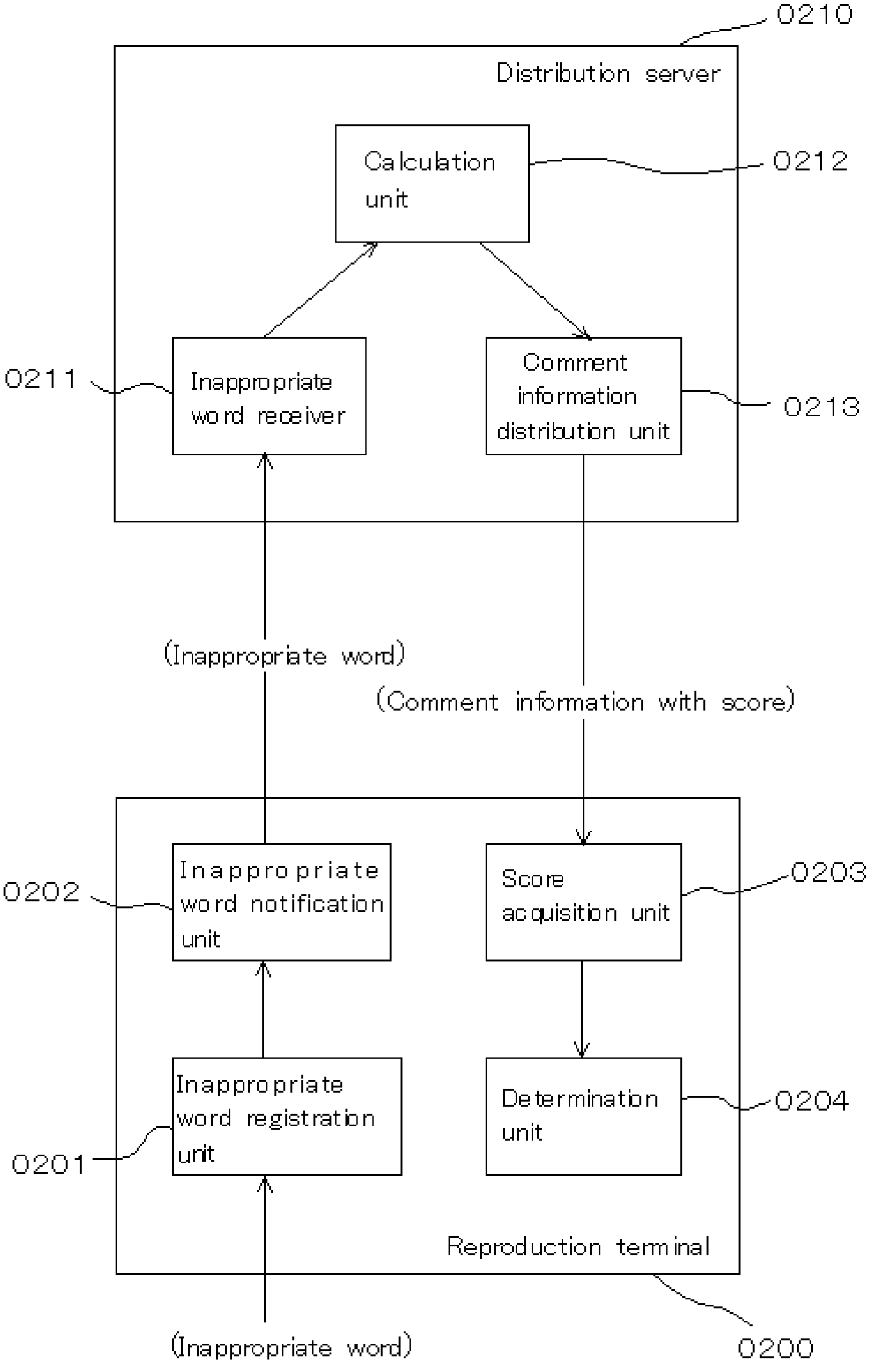
FIG. 2 is a functional block diagram of the comment distribution system of the first embodiment.

FIG. 2 is a functional block diagram of the comment distribution system of the first embodiment. Note that, the following functional block of the terminal and server of the comment distribution system can be implemented by a combination of hardware and software.

Specifically, in the case of utilizing a computer, examples of the hardware and software include hardware components configured by a CPU, a main memory, a bus, a secondary storage device (e.g., a hard disk or a nonvolatile memory, a storage media such as CD-ROM or DVD-ROM, or a reading drive for the above media), an input device for inputting information, a printing device, a display device, other peripheral devices; and interfaces for the other peripheral devices and a communication interface; and driver program for controlling the above hardware, other application programs, and an application for user interface.

The CPU executes an operation in accordance with the program developed on the main memory, so that processing and storing of the data, inputted through the input device or the interface etc. and stored in the memory of the hard disk, are executed, and instructions to control the hardware and software are generated. Moreover, the functional block of the system may be implemented by a specialized hardware. Moreover, the present invention can be implemented not only as a system but also as a method thereof. Moreover, a portion of such inventions may be configured as software. Furthermore, a software product used for causing a computer to execute such software, and the recording medium, in which the software is installed, should be included in the technical scope of the present invention (the same applies throughout the entire specification).

As shown in FIG. 2, the comment distribution system of the first embodiment comprises a 'reproduction terminal' (0200) for a user, and a 'distribution server' (0210) for distributing a comment information with score to the reproduction terminal. The comment information can be reproduced by interlocking with movie information to be reproduced, and a score is added thereto.

The 'reproduction terminal' comprises an 'inappropriate word registration unit' (0201), an 'inappropriate word notification unit' (0202), a 'score acquisition unit' (0203), and a 'determination unit' (0204).

The 'inappropriate word registration unit' (0201) has a function of registering the comment, reproduced on a basis of the comment information, as an inappropriate word according to a designation by the user as a viewer, and can be implemented, for example, by a GUI (Graphical User Interface) for registration, an input device, a CPU, a main memory, and an inappropriate word registration program.

Figure 3:
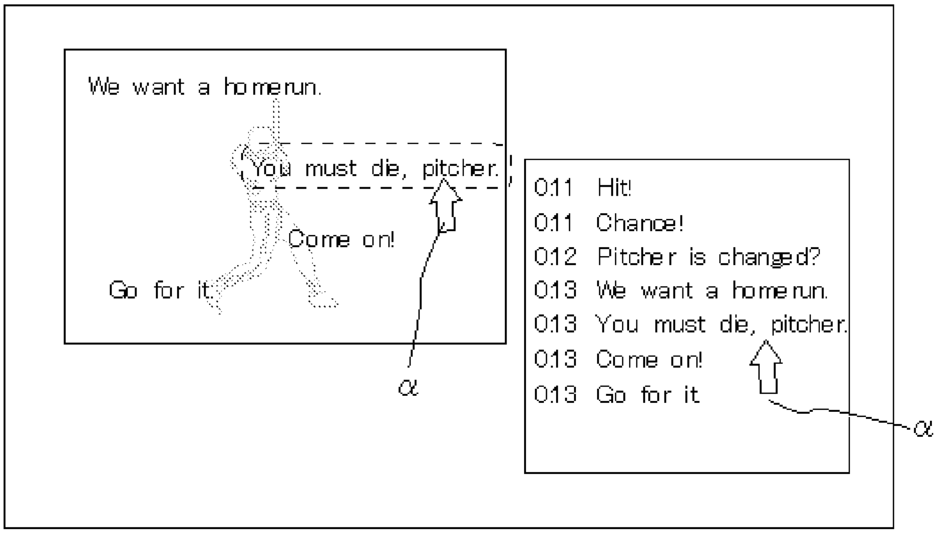
FIG. 3 is a conceptual diagram exemplifying an inappropriate word registration by an inappropriate word registration unit of the comment distribution system of the first embodiment.
Figure 3:
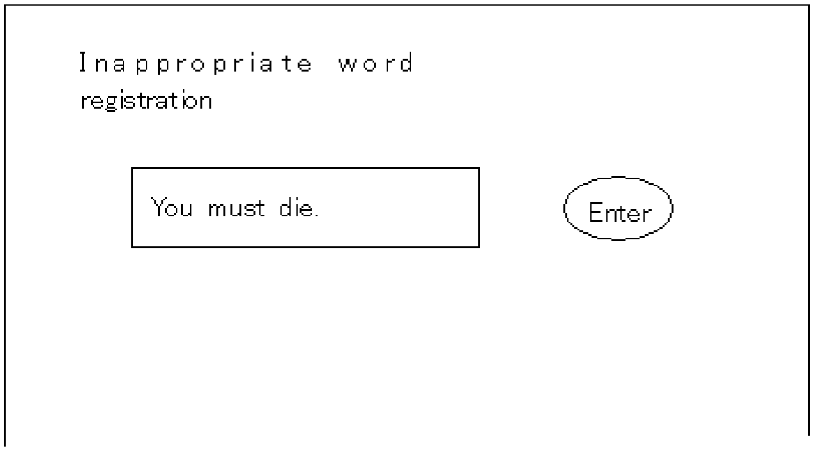

FIG. 3 (*a*) is a conceptual diagram exemplifying an inappropriate word registration by an inappropriate word registration unit. As shown in FIG. 3 (*a*), for example, a user moves a cursor onto the comment α which is displayed by interlocking (overlapping) with the movie on the display screen, or the comment α which is in a comment list displayed next to the movie by interlocking (in separate frame) with the movie, and enter it by clicking etc. Then, the comment is designated from positional information of the cursor, and is registered as the inappropriate word. Moreover, all words in the designated comment may be registered as the inappropriate word, or a part of the words in the comment, which has been edited through a edit screen etc. displayed after the registration, may be registered as the inappropriate word.

FIG. 3 (*b*) is a conceptual diagram exemplifying another inappropriate word registration. In FIG. 3 (*b*), the comment currently displayed by interlocking with the movie is not designated. As shown in FIG. 3 (*b*), the user directly enters the inappropriate word for registration into a character entry field β in an entry screen at arbitrary timing.

Moreover, the user as a viewer may not designate the inappropriate word. For example, it is possible to acquire data of words such as a banned word or a discriminatory word from the external source through network or a portable storage medium, thereby registering the word.

Moreover, the distribution server may distribute the comment information with score, that can be displayed by interlocking with movie information to be reproduced, as the comment information with score that can be reproduced by interlocking with movie information to be reproduced.

Figure 25:
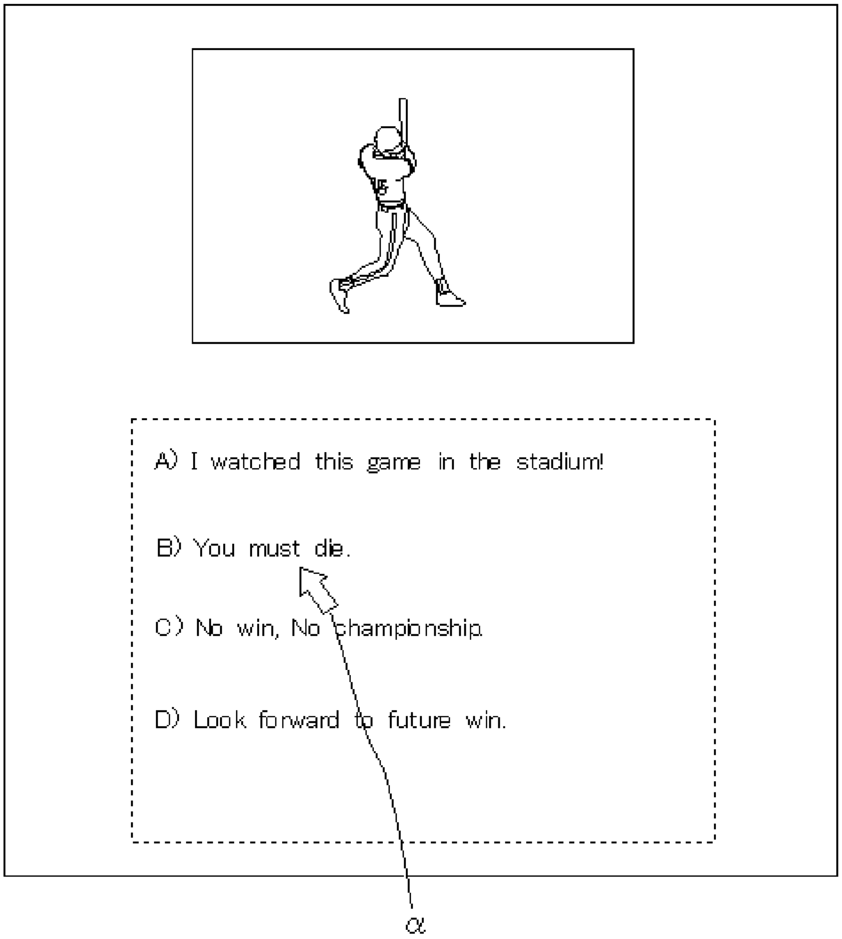
FIG. 25 is an illustration of displaying the distributed comment by interlocking with the movie in the comment distribution system of the first embodiment.

FIG. 25 is an illustration of displaying the distributed comment by interlocking with the movie in the comment distribution system of the first embodiment. As shown in FIG. 25, for example, it is possible to arrange the movie player in the upper portion of the screen, and to statically display the comment entered for the reproduced movie by the player in the comment display field in the lower portion of the screen.

Subsequently, when moving the cursor a onto the displayed comment or the displayed partial word in the comment, and receiving a predetermined operation for the inappropriate registration, thereby registering the entire comment or the partial word as the inappropriate word.

The 'inappropriate word notification unit' (0202) has a function of notifying the distribution server of the registration of the inappropriate word, and can be implemented, for example, by a communication circuit for connecting to the internet etc, a CPU, a main memory, and an inappropriate word notification program. Note that, as to the inappropriate word notification, only the registered inappropriate word may be notified, or for example, when a degree of inappropriate is set to the inappropriate word and is registered, information of the degree may be notified together. Moreover, when designating the entire comment as the inappropriate word, a comment ID for identifying the comment may be notified as the inappropriate word.

Moreover, when the all or part of the comment to be displayed by interlocking with the movie is preliminarily distributed to the reproduction terminal, in the reproduction terminal, a search of the distributed all or part of the comment may be executed using the registered inappropriate word as a key, thereby generating a list of comments including the inappropriate word. Moreover, the generated list may be notified to the distribution server as the inappropriate word.

The 'score acquisition unit' (0203) has a function of acquiring the score added to the comment information distributed from the distribution server, and can be implemented, for example, by a CPU, a main memory, and a score acquisition program.

Specifically, the comment information to be acquired, which is to be displayed by interlocking with the movie on the screen of the reproduction terminal includes, for example, various tags as shown in FIG. 4. The <Comment> tag indicates the comment, and the <User> tag indicates the comment user ID. The <score> tag indicates a score, and the score acquisition unit acquires the score '80' added to the comment information with reference to the tag.

The 'determination unit' (0204) has a function of determining whether the comment is to be reproduced by interlocking with the movie information according to the acquired score, and can be implemented, for example, by a CPU, a main memory, and a determination program.

Specifically, the determination unit compares the acquired score and the threshold preliminarily stored in the reproduction terminal, thereby determining that the interlocking display of the comment is not executed when the score is less than or equal to (or more than or equal to) the threshold. Note that the threshold may be arbitrarily varied, and examples thereof include an input value by the user or a value acquired according to various configuration information.

Moreover, for example, in the case of the movie with high entertainment feature, since the user can enjoy even an unusual comment, it is possible to set a higher threshold. Therefore, it is possible to separately set a threshold according to attribute information such as a category of the movie as a target for interlocking display of the comment (e.g., producer, cast, production year, shooting location, viewer age limitation of the movie, other than the category). Subsequently, the determination unit acquires the attribute information of the movie as a target for interlocking display of the comment, thereby acquiring the threshold according to the attribute information.

Moreover, the comment directly registered by the user as the inappropriate word to the inappropriate word registration unit may be not displayed regardless of the score, or the comment entered by the user may not be displayed regardless of the score.

Moreover, the processing in the determination unit according to the determination as to interlocking reproduction of the comment is not limited to the processing of display/non-display of the comment. Examples of the processing include a processing for increasing permeability in displaying the comment, a processing for miniaturizing the comment, and a processing for high-speed scrolling of the comment.

Thus, the reproduction terminal can determine the display/non-display of the comment with respect to each reproduction terminal according to the score added to the comment on the basis of the calculated value in the after-mentioned distribution server.

Hereinafter, descriptions of the components of the distribution server for calculating the score and distributing the comment with score will be provided with reference to FIG. 2. Note that the distribution server may be configured separately from the movie distribution server, thereby distributing only the comment by interlocking with the movie distribution server, or may distribute the comment with the movie. As shown in FIG. 2, the 'distribution server' (0210) comprises an 'inappropriate word receiver' (0211), a 'calculation unit' (0212), and a 'comment information distribution unit' (0213).

The 'inappropriate word receiver' (0211) has a function of receiving the inappropriate word, and can be implemented, for example, by a CPU, a main memory, and an inappropriate word receiving program. Moreover, as the description of the inappropriate word notification unit, the receiver may receive the user ID with the information of degree of inappropriate.

Moreover, as described above, when the list of comments including the inappropriate word is transmitted from the reproduction terminal, the distribution server may check the list against the database of the comment stored in the server, thereby determining the comment included in both list and database as the inappropriate word.

The 'calculation unit' (0212) has a function of reducing the score added to the comment information corresponding to the inappropriate word notification, and can be implemented, for example, by a CPU, a main memory, and a calculation program.

Specifically, when the notified inappropriate word is the comment ID, the score of the comment identified by the ID is reduced. When a word included in the comment as the inappropriate word is notified, the search of the distributed comment is executed using the registered inappropriate word as a key, thereby reducing the score of the searched comment.

Moreover, for example, the reduction value of the score may be '2' or '98% (of current score)' for one notification without exception. Moreover, when the score (user score) is added with respect to each user, for example, '120' is added to a sensible user and '50' is added to an eccentric user, the reduction value for the score of the comment may be calculated according to the user score. In this case, the user ID of the registered user is acquired upon the inappropriate word notification, the search of the user score database is executed using the user ID as a key, thereby searching for the user score of the user. Subsequently, the reduction value may be calculated by a predetermined formula, for example, '1.2' for the user score 120, or '0.5' for the user score 50 is acquired.

Moreover, when the reduction value for the score is set upon setting inappropriate for the respective users, the reduction value may be varied according to various factors. For example, the user registration is requested upon using the service by the comment distribution system, and according to elapsed time period from the registration, a larger reduction value may be set since it is assumed that the user, who has used the service for a long time, can appropriately determine inappropriate. Moreover, the number of inappropriate registrations or the number of comment entries is counted with respect to each user, thereby adjusting the reduction value according to the number.

Moreover, the calculation unit may calculate not only by reduction but also by increase. In this case, in order to achieve the same effect, the determination unit of the reproduction terminal may determine non-display of the comment when the score is more than or equal to the threshold.

Moreover, the initial value of the comment score before the inappropriate word notification may be, for example, '100' without exception, or may be a value on the basis of the user score of the comment user (e.g., if the user score is '120', the initial value of the comment is '120').

Moreover, since it is difficult to display the comment entered long time before when the score added to the comment is permanently reduced, for example, the scores of all comments may be restored to the initial values at a predetermined interval. Moreover, it is possible to limit the validity period of the reduction for one inappropriate word notification to one month etc, and to recover the reduced value for each inappropriate word notification after the period.

The 'comment information distribution unit' (0213) has a function of distributing the comment information with score, and can be implemented, for example, by a communication circuit for connecting to the internet, a CPU, a main memory, and a comment information distribution program.

FIG. 5 is a diagram exemplifying a database of the comment information referred upon distribution of the comment information. As shown in FIG. 5, in the database of the comment information, comment ID, movie ID for interlocking display, user ID, content of comment, comment reproduction timing, and score are correlated and stored. The 'comment reproduction timing' is information indicated by elapsed time (or elapsed frame) from the starting point of reproducing the movie as a target for the interlocking display of the comment such as the information '13 min. 01 sec. from start of reproducing movie a' as shown in FIG. 5.

Moreover, for example, when the viewer user enters the comment for the movie being currently reproduced on a real-time basis, the elapsed time from the starting point of reproducing the movie at the entry of the comment may be acquired as the reproduction timing, or time information arbitrarily entered by the user into a 'comment reproduction timing' field in the GUI having an entry field for the above items may be acquired as the reproduction timing.

Moreover, in the comment information distribution unit, for example, when acquiring the movie ID according to the distribution request for the movie from the reproduction terminal, the search of the database of the comment information is executed using the movie ID as a key, thereby specifying the comment to be displayed by interlocking with the movie. Subsequently, the specified comment with the score, correlated with the comment, are distributed to the reproduction terminal as a source of the distribution request.

Subsequently, the reproduction terminal determines display/non-display of the comment by utilizing the threshold, independently stored in the terminal, and the score added to each comment, thereby executing the display/non-display of the comment with respect to each reproduction terminal.

Hardware Configuration of First Embodiment

Figure 6:
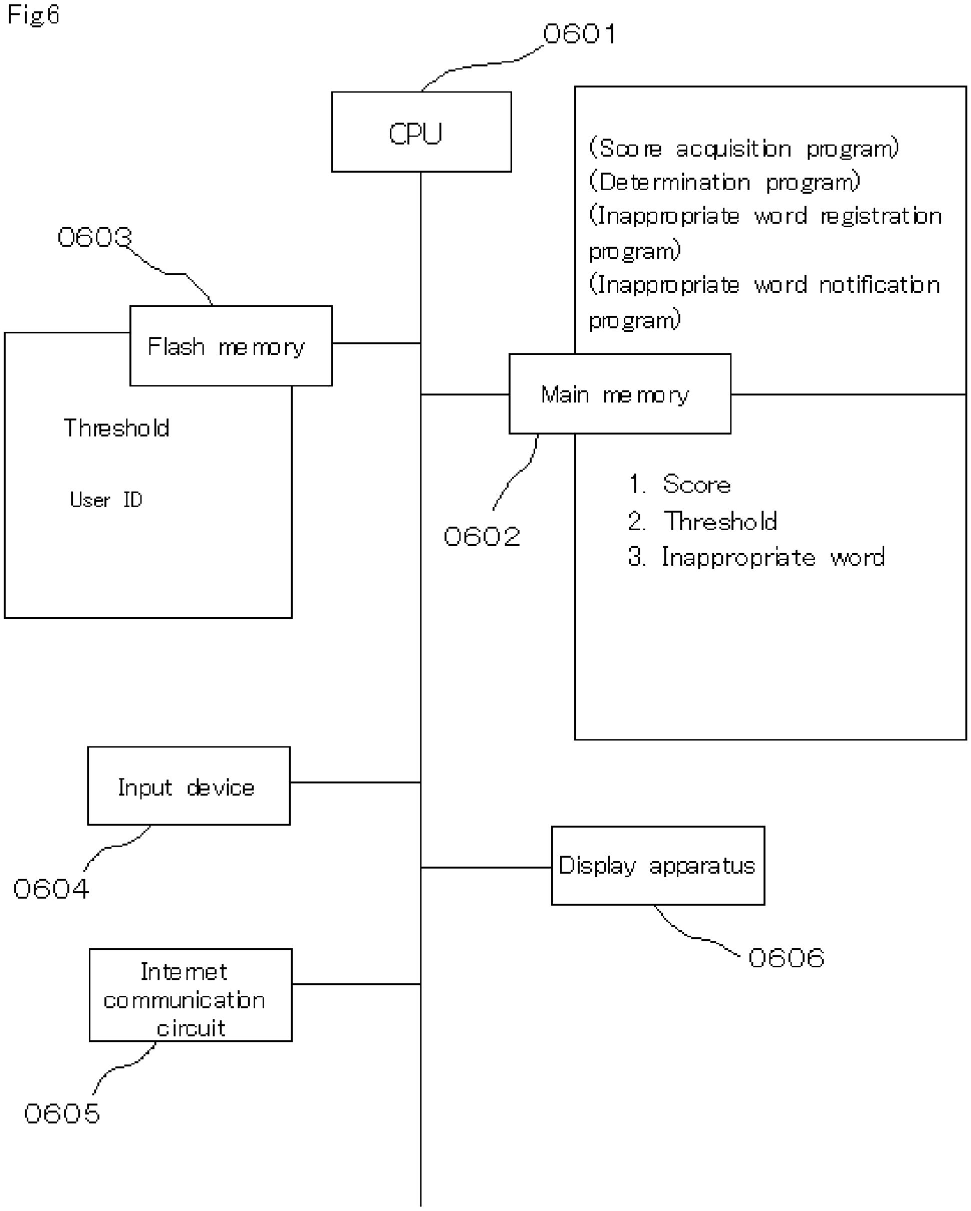
FIG. 6 is a diagram exemplifying a hardware configuration of the reproduction terminal of the comment distribution system of the first embodiment.
Figure 7:
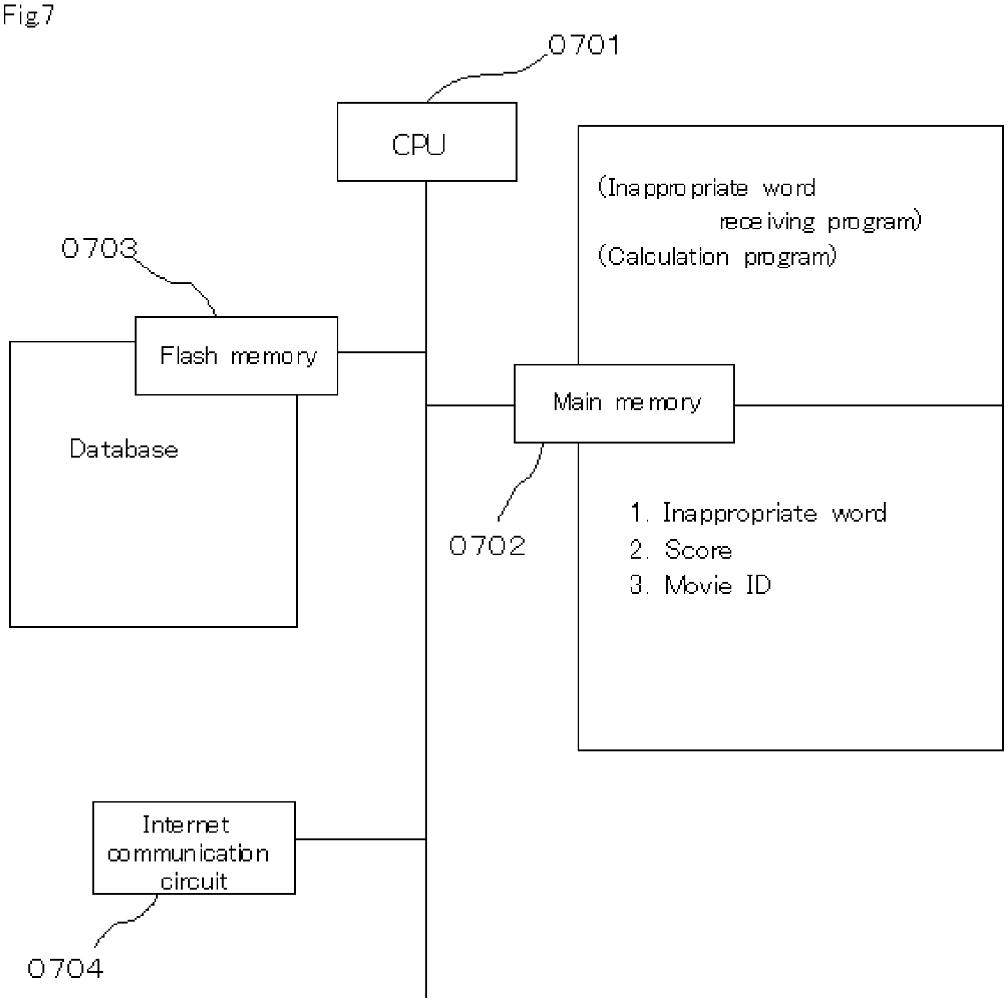
FIG. 7 is a diagram exemplifying a hardware configuration of the distribution server of the comment distribution system of the first embodiment.

FIG. 6 is a diagram exemplifying a hardware configuration of the reproduction terminal of the comment distribution system. FIG. 7 is a diagram exemplifying a hardware configuration of the distribution server of the comment distribution system.

As shown in FIG. 6, the reproduction terminal is provided with a 'CPU' (0601), and a 'main memory' (0602), thereby executing various calculations and implementing the score acquisition unit and the determination unit. Moreover, the reproduction terminal is provided with a 'flash memory' (0603) for storing a threshold etc, an 'input device' for registering the inappropriate word, and an 'Internet communication circuit' (0605) for the inappropriate word notification unit, and a 'display device' (0606) for displaying a movie and a comment. These components are mutually connected through the data communication path of 'system bus', thereby carrying out transmission/reception and processing of the information.

Moreover, the programs are developed in the 'main memory', and the 'CPU' refers to the program and executes the various calculations. Moreover, a plurality of addresses are assigned to the main memory and the 'flash memory', and in the calculation by the 'CPU', address specification and access to the stored data are carried out, thereby executing the calculation by utilizing the data.

Hereinafter, the respective hardware configuration in displaying the comment by the reproduction terminal will be described. For example, the reproduction terminal transmits the distribution request for the desired movie utilizing the Web browser by utilizing the distribution service for the movie with comment provided through the internet, and acquires the movie information and the comment information to be displayed by interlocking with the movie, which are retuned in response to the request, through the 'internet communication circuit'.

Subsequently, the 'CPU' interprets the score acquisition program, and according to an interpretation result, for example, acquires the score added to the comment information with reference to the tag, and stores the score at the address 1 in the 'main memory'. Subsequently, the 'CPU' interprets the score determination program, and according to a determination result, for example, reads out the threshold stored in the 'flash memory', and stores the threshold at the address 2 in the 'main memory'. Note that, this threshold may be varied by a varying operation through the 'input device'.

Subsequently, the 'CPU' executes a comparison processing, thereby outputting a determination result indicating which is larger, the score or the threshold. When it is determined that the score is larger than the threshold, the comment becomes displayable on the reproduction terminal, and displayed on the 'display apparatus' at a predetermined timing.

Hereinafter, the respective hardware configuration in registering the inappropriate word by the reproduction terminal will be described. When the displayed comment makes the user unpleasant, the user designates the comment as the inappropriate word through the 'input device', and the operation is received. Subsequently, the 'CPU' interprets the inappropriate word registration program, and according to an interpretation result, stores the received inappropriate word at the address 10 in the 'main memory'. Moreover, the user ID stored in the 'flash memory' may be acquired in response to the registration of the inappropriate word, and stores the user ID in the 'main memory'. Moreover, when the degree of inappropriate of the inappropriate word is inputted through the 'input device', the information of degree may be also stored in the 'main memory'.

Subsequently, the 'CPU' interprets the inappropriate word notification program, and according to an interpretation result, transmits the inappropriate word stored at the address 1 in the 'main memory', and the stored various information to the distribution server through the 'internet communication circuit'

As described above, the reproduction terminal determines display/non-display of the comment displayed by interlocking with the movie, and registers and notifies the inappropriate word. Hereinafter, the respective hardware configuration in displaying the comment by the distribution server will be described with reference to FIG. 7.

As shown in FIG. 7, the distribution server is provided with a 'CPU' (0701), and a 'main memory' (0702), thereby executing various calculations and implementing the calculation unit. Moreover, the distribution server is provided with a 'HDD' (0703) for storing the various database and the comment information, and an 'Internet communication circuit' (0704) for the inappropriate word receiver, and the comment information distribution unit.

Subsequently, when receiving the inappropriate word notification from the reproduction terminal through the 'Internet communication circuit', the 'CPU' interprets the inappropriate word receiving program, and according to an interpretation result, stores the notified inappropriate word at the address 1 in the 'main memory'. Subsequently, the 'CPU' interprets the calculation program, and when the comment ID indicates that the notified inappropriate word is the comment itself, executes a search of the column of comment ID in the database of FIG. 5 stored in the 'HDD' by using the comment ID as a key, thereby specifying the comment. When the inappropriate word is word information, the CPU executes a search of the column of content of comment in the database by using the inappropriate word as a key, thereby specifying one or more comments including the word.

Subsequently, the score correlated with the specified comment is acquired, and stored at the address 2 in the 'main memory'. Subsequently, for example, when reducing by the same reduction value without exception, the reduction value is read out from the 'HDD', the 'CPU' executes calculation, thereby reducing the 'score'.

Moreover, the user score, acquired by searching the user score database by using the notified inappropriate word and the received user ID as keys, is used as variable, and the 'CPU' executes calculation, thereby acquiring the reduction value and updating the score of the comment.

Moreover, when receiving the distribution request for the movie from the reproduction terminal, the movie ID is acquired through the 'Internet communication circuit', and according to an interpretation result of the comment information distribution program, the movie ID is stored at the address 3 in the 'main memory'. Subsequently, a search of the comment information database is executed by using the movie ID as a key, the comment to be displayed by interlocking with the movie is specified, and the comment information including the content of comment and the score is stored at the address 4 in the 'main memory'. Subsequently, the comment information is distributed to the reproduction terminal as a source of the distribution request through the 'Internet communication circuit'.

Processing Flow of First Embodiment

Figure 8:
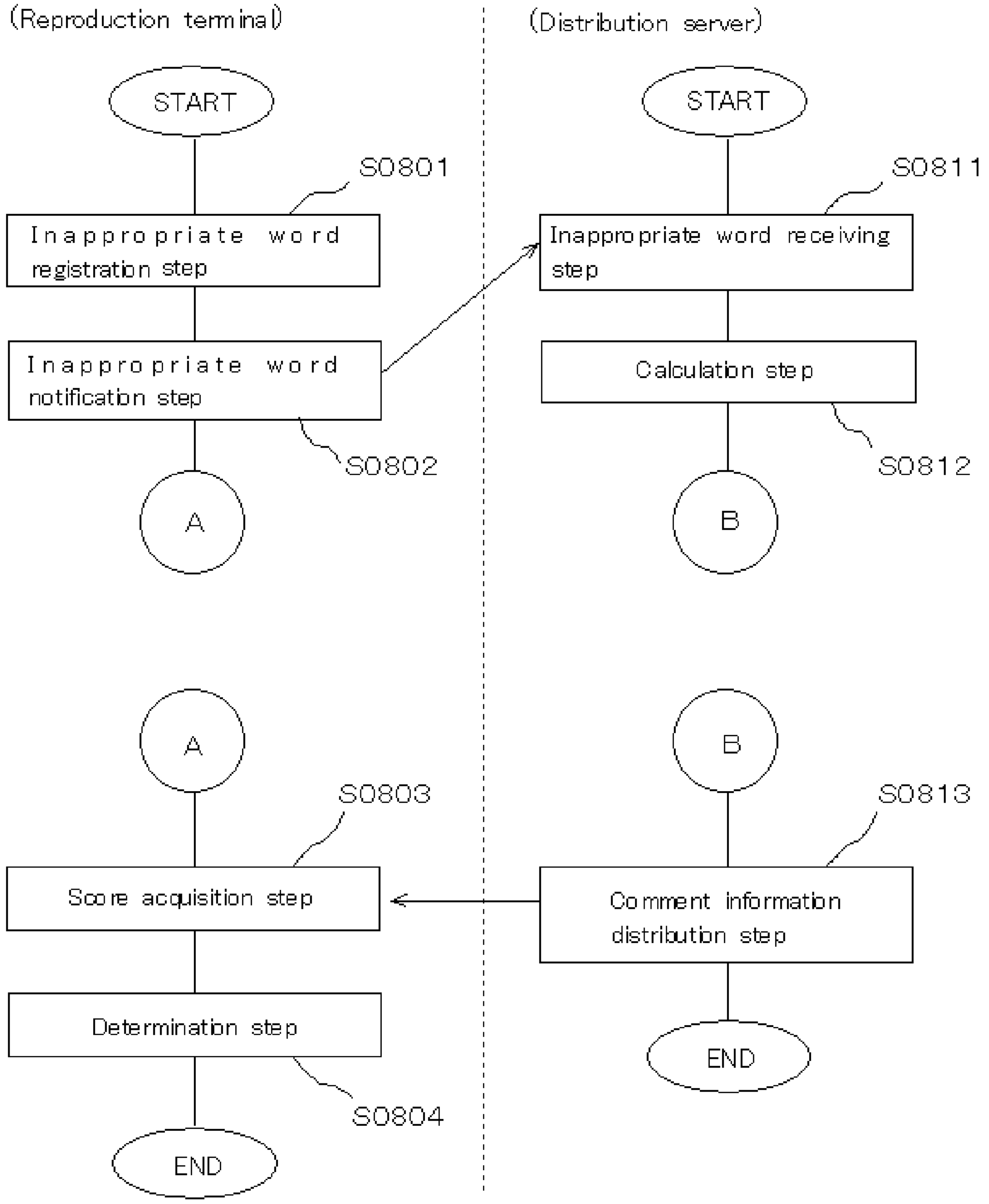
FIG. 8 is a flowchart of the comment distribution system of the first embodiment.

FIG. 8 is a flowchart of the comment distribution system of the first embodiment. Note that, the following step may be executed by the respective hardware configurations of a computer as above, or may configure a program, which is stored in a medium and is for controlling the computer.

As shown in FIG. 8, at the outset, the inappropriate word registration is received in the reproduction terminal (step S0801). Examples of the registration include a registration by directly designating the comment being currently displayed by interlocking with the movie, a registration by entering the inappropriate word at an arbitrary timing, or a registration by acquiring the inappropriate word from an external inappropriate word dictionary etc. Subsequently, in response to the registration, the registration of the inappropriate word is notified to the distribution server through the 'Internet communication circuit' (step S0802).

In the distribution server, when the notified inappropriate word is received (step S0811), the score added to the comment information corresponding to the inappropriate word notification is reduced (step S0812). For example, the score of the comment corresponding to the notified inappropriate word may be reduced by same reduction value without exception, or the reduction value may be calculated on the basis of the user score of the user who has notified the inappropriate word, and reduction may be executed by different reduction value with respect to each user.

Subsequently, the distribution server distributes the comment information with score to be displayed by interlocking with the movie in response to the movie distribution request (step S0813).

The reproduction terminal as the request source acquires the score from the comment information when receiving the distributed movie and the comment information with score (step S0803). Subsequently, the score is compared with the threshold stored in the terminal, thereby determining whether the comment is to be reproduced by interlocking with the movie information (step S0804). When determining the reproduction of the comment, the comment is displayed by interlocking with the movie at a predetermined timing.

Effects of First Embodiment

According to the comment distribution system of the first embodiment, it is possible to compare the score, which is added to each comment, and is reduced according to the inappropriate word registration by the viewer user, with the threshold, which is set to each reproduction terminal, thereby determining display/non-display of the comment with respect to each reproduction terminal.

Therefore, according to the viewer user's tolerance etc. for the comment, it is possible to determine the display/non-display of the comment with respect to each user.

Second Embodiment

Outline of Second Embodiment

A second embodiment is a comment distribution system similar to the first embodiment, wherein the score is added with respect to each comment, thereby determining the display/non-display of the comment utilizing the score in the reproduction terminal. The difference with the first embodiment is that the reduction of the score is executed based not on the inappropriate word registration, but on 'inappropriate comment user registration', where the comment user is a target for the inappropriate registration.

For example, when the user α is registered as the inappropriate comment user in the reproduction terminal, the registration is notified to the distribution server, thereby executing the reduction of the score for the comment entered by the user α.

Functional Configuration of Second Embodiment

Figure 9:
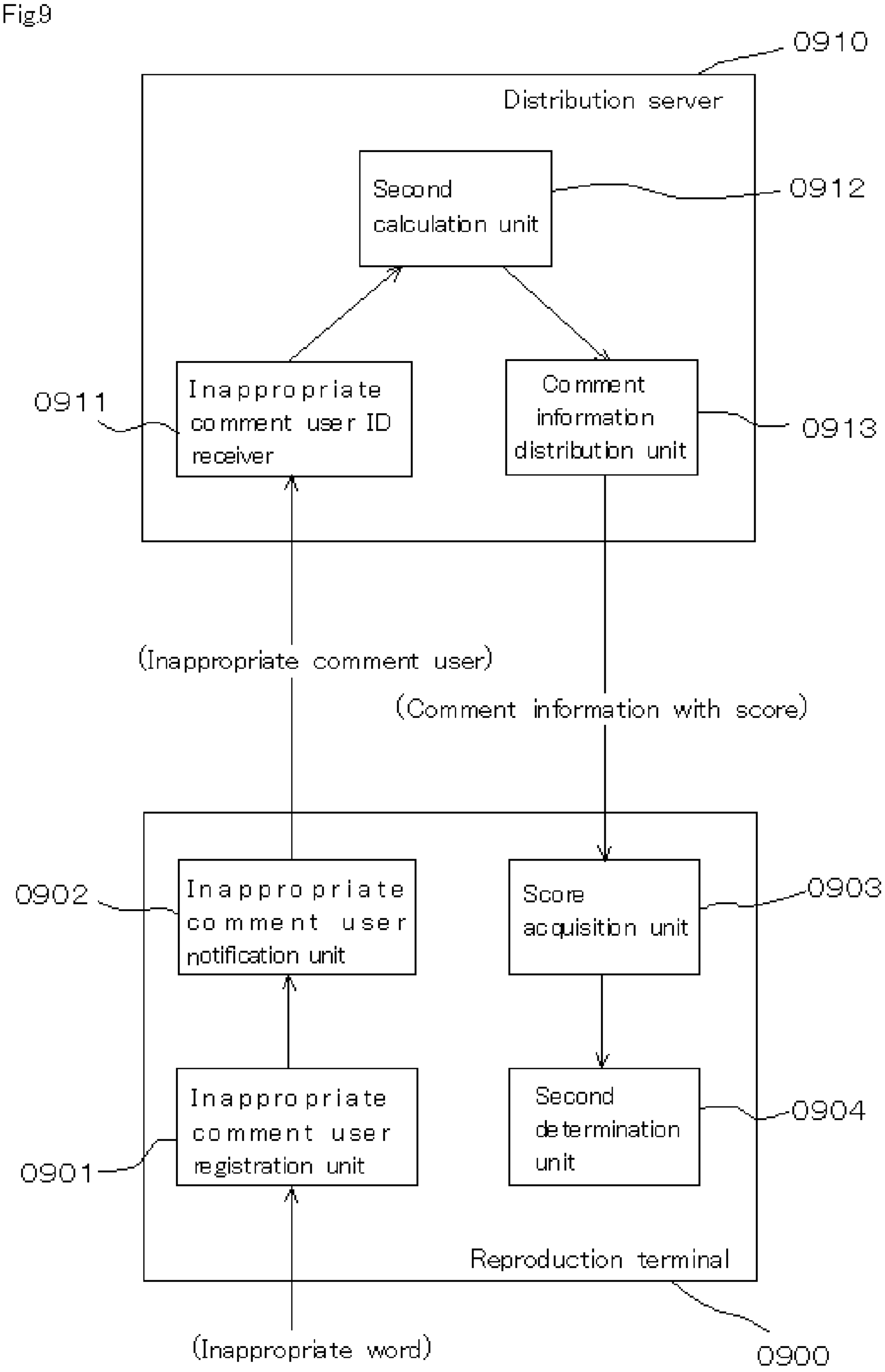
FIG. 9 is a functional block diagram of a comment distribution system of a second embodiment.

FIG. 9 is a functional block diagram of a comment distribution system of a second embodiment. As shown in FIG. 9, the comment distribution system of the second embodiment comprises a 'reproduction terminal' (0900) for a user, and a 'distribution server' (0910) for distributing a comment information with score to the reproduction terminal.

The 'reproduction terminal' comprises a 'inappropriate comment user registration unit' (0901), a 'inappropriate comment user notification unit' (0902), a 'score acquisition unit' (0903), and a 'second determination unit' (0904).

Note that the 'score acquisition unit' and the 'second determination unit' are the same (only the head number is different) as those of the first embodiment, so that descriptions thereof are omitted. Moreover, the 'inappropriate comment user registration unit' and the 'inappropriate comment user notification unit' are basically the same as the 'inappropriate word registration unit' and the 'inappropriate word notification unit' excluding that the target for registration and notification is not the inappropriate word but the inappropriate comment user ID, so that descriptions thereof are omitted.

Moreover, as shown in FIG. 9, the distribution server comprises a 'inappropriate comment user ID receiver' (0911), a 'second calculation unit' (0912), and a 'comment information distribution unit' (0913). Note that the 'comment information distribution unit' is the same as that of the first embodiment, and the 'inappropriate comment user ID receiver' is basically the same excluding that the target for reception is not the inappropriate word but the inappropriate comment user ID, so that descriptions thereof are omitted.

The 'second calculation unit' (0912) has a function of determining whether the comment is to be reproduced by interlocking with the movie information according to the acquired score, and can be implemented, for example, by a CPU, a main memory, and a calculation program. Specifically, a search of the column of user ID in the database of FIG. 5 by using the inappropriate comment user ID as a key, thereby reducing the score correlated with the searched comment.

Note that the calculation unit may execute other reduction processes such as calculation of the reduction value, initializing the score, and restoring the score, similar to the calculation unit of the first embodiment.

Processing Flow of Second Embodiment

Figure 10:
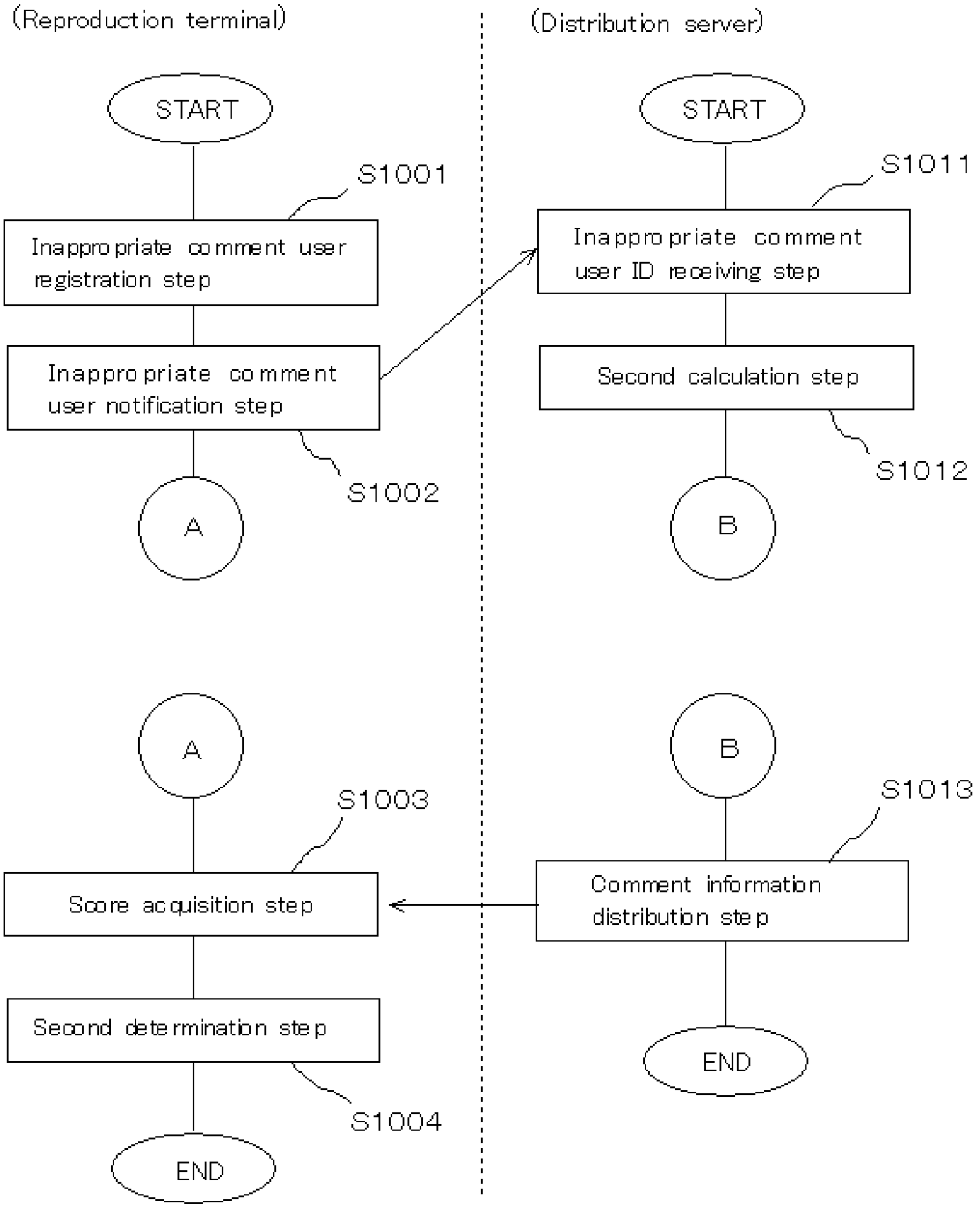
FIG. 10 is a flowchart of the comment distribution system of the second embodiment.

FIG. 10 is a flowchart of the comment distribution system of the second embodiment. Note that, the following step may be executed by the respective hardware configurations of a computer as above, or may configure a program, which is stored in a medium and is for controlling the computer.

As shown in FIG. 10, at the outset, the inappropriate comment user registration is received in the reproduction terminal (step S1001). Examples of the registration include a registration of a comment user ID by directly designating the comment being currently displayed by interlocking with the movie, a registration by entering the comment user ID at an arbitrary timing, or a registration by selecting the user ID from an external inappropriate comment user ID database etc. Subsequently, in response to the registration, the registration of the inappropriate comment user is notified to the distribution server through the 'Internet communication circuit' (step S1002).

In the distribution server, when the notified inappropriate comment user ID is received (step S1011), the score added to the comment information corresponding to the inappropriate comment user notification is reduced (step S1012). Specifically, a search for the comment entered by the user is executed by using the notified inappropriate comment user ID as a key, thereby specifying the comment.

Subsequently, for example, the score of the corresponding comment may be reduced by the same reduction value without exception, or the reduction value may be calculated on the basis of the user score of the user, who has notified the inappropriate word, and reduction may be executed by different reduction value with respect to each user.

Subsequently, the distribution server distributes the comment information with score to be displayed by interlocking with the movie in response to the movie distribution request (step S1013).

The reproduction terminal as the request source receives the distributed movie and the comment information with score, and acquires the score from the comment information by reading out the score to the main memory (step S1003). Subsequently, the score is compared with the threshold stored in the terminal, thereby determining whether the comment is to be reproduced by interlocking with the movie information (step S1004). When determining the reproduction of the comment, the comment is displayed by interlocking with the movie at a predetermined timing.

Effects of Second Embodiment

According to the stage production system of the second embodiment, it is possible to compare the score, which is added to each comment, and is reduced according to the inappropriate comment user registration by the viewer user, with the threshold, which is set to each reproduction terminal, thereby determining display/non-display of the comment with respect to each reproduction terminal.

Therefore, also in the second embodiment, according to the viewer user's tolerance etc. for the comment, it is possible to determine the display/non-display of the comment with respect to each user.

Third Embodiment

Outline of Third Embodiment

A third embodiment is a comment distribution system on the basis of the second embodiment, wherein the score is added with respect to each user, and the score added to the comment is on the basis of the user score of the comment user. When registering the inappropriate comment user, the user score of the user identified by the user ID is reduced.

Therefore, the comment score of the user with user score '120' is '120', and the comment score of the user with user score '50', who has entered many comments registered as the inappropriate comment by many users, is '50'

Functional Configuration of Third Embodiment

Figure 11:
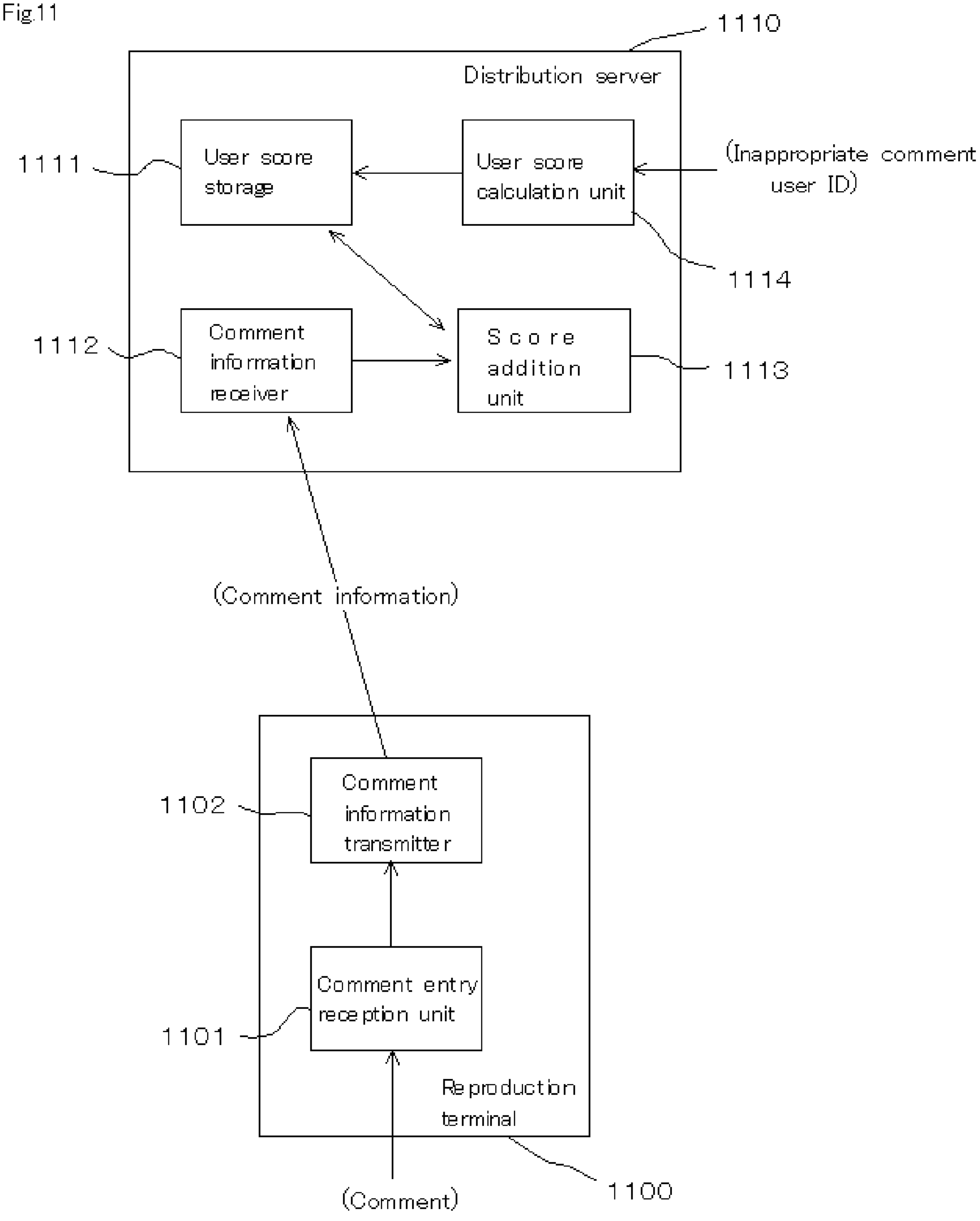
FIG. 11 is a functional block diagram of a comment distribution system of a third embodiment.

FIG. 11 is a functional block diagram of a comment distribution system of a third embodiment. As shown in FIG. 11, the comment distribution system of the third embodiment is on the basis of the second embodiment, and comprises a 'reproduction terminal' (1100), and a 'distribution server' (1110). The 'reproduction terminal' comprises a 'inappropriate comment user registration unit', a 'inappropriate comment user notification unit', a 'score acquisition unit', and a 'second determination unit', and these components are the same as those of the above embodiment, so that descriptions and figures are omitted. The 'distribution server' comprises a 'inappropriate word receiver', a 'second calculation unit', and a 'comment information distribution unit, and these components are the same as those of the above embodiment, so that descriptions and figures are omitted.

In the comment distribution system of a third embodiment, the reproduction terminal further comprises a 'comment entry reception unit' (1101) and a 'comment information transmitter' (1102), and the distribution server further comprises a 'user score storage' (1111), a 'comment information receiver' (1112), a 'score addition unit' (1113), and a 'user score calculation unit' (1114).

The 'comment entry reception unit' (1101) has a function of receiving an entry of the comment information, that can be reproduced by interlocking with the distributed movie information, and can be implemented, for example, by a GUI and an input device for entry of a comment, a CPU, a main memory, and a comment entry receiving program.

Specifically, when entering the comment into the comment entry field while viewing the movie displayed on the screen, the information of content of comment and the information of timing of displaying the comment are acquired. Moreover, the entered comment may be displayed on a real-time basis by interlocking with the movie after a real-time determination on the score.

Moreover, the user may enter the movie ID as a target for interlocking display, the content of comment, and the timing information of displaying the comment at an arbitrarily timing through a predetermined input GUI, and the information may be received as the comment information.

The 'comment information transmitter' (1102) has a function of transmitting the received comment information with the comment user ID, and can be implemented, for example, by an internet communication circuit, a CPU, a main memory, and a comment information transmission program. Specifically, the transmitted comment includes, for example, the movie ID as the target for interlocking display, text data of the content of the comment, and the information of timing of displaying the comment. Moreover, the user ID stored in the reproduction terminal may be acquired and correlated with the comment information.

Subsequently, the components of the distribution server are described. The 'user score storage' (1111) has a function of correlating and storing the user ID, and a user score, indicating a score corresponding to the user ID, and can be implemented, for example, by various storage such as a flash memory or a HDD. In the third embodiment, the user score is used for determining the comment score and the user score is reduced upon registration of the inappropriate comment user.

The 'comment information receiver' (1112) has a function of receiving the comment user ID and the comment information, and can be implemented, for example, by a CPU, a main memory, and a score addition program.

Specifically, a search of the user score storage is executed by using the comment user ID as a key, thereby specifying the user score. Subsequently, on the basis of the specified user score, the score added to the comment information is calculated, and the calculated score is correlated with the comment, thereby generating a database of FIG. 5. Therefore, the comment score of the user with user score '120' is '120', and the comment score of the user with user score '50' is '50'

The 'user score calculation unit' (1114) has a function of reducing the user score, correlated with the received user ID of the inappropriate comment user and stored in the user score storage, and can be implemented, for example, by a CPU, a main memory, and a user score calculation program. Note that as to the calculation of the reduction value, for example, the score of the corresponding comment may be reduced by the same reduction value without exception, or the reduction value may be calculated on the basis of the user score of the user, who has registered the inappropriate word. Moreover, the user score is not permanently reduced, and for example, the user score may be restored when fulfilling a predetermined condition (e.g., elapse of a predetermined period or increase of user score) similar to the reduction of the comment score.

Therefore, the user, who has entered many comments registered as the inappropriate comment by many users, has low user score, resulting in low score of the comment.

Other Example 1

In other example of the third embodiment, the reproduction terminal, not the distribution server, may comprise the score addition unit. Therefore, the reproduction terminal preliminarily (e.g., at login for using service) transmits the user ID of the user of the reproduction terminal to the distribution server. Then, the distribution server transmits the user score of the user stored in the user score storage to the reproduction terminal. When entering the comment in the reproduction terminal, the user score is added as the score for the comment in the reproduction terminal, and transmitted to the distribution server.

Other Example 2

Moreover, the user score storage of the third embodiment may store a plurality of subdivided user scores correlated with the user ID. For example, as in the after-mentioned ninth embodiment, the user score may be stored with respect to each combination of the user ID and the movie ID, with respect to each combination of the user ID and the category ID of the movie, or with respect to each combination of the user ID and the tag ID (e.g., text data indicating attribute information such as producer, cast, and production year). Thus, it is possible to manage the user score concerning a certain movie (or movie classified by a predetermined category/tag). For example, when a user enters many inappropriate comments for one movie, but few inappropriate comments for the other movie, it is possible to reduce only the user score, correlated with the one movie of many inappropriate comments, among the subdivided user scores. In this case, the user score '50' is added as the comment score for the one movie, and the user score '80' is added as the comment score for the other movie.

Moreover, it is possible to execute parallel management of the user score correlated only with the user ID, and a plurality of user scores with respect to each combination of the subdivided user ID and the movie ID etc. In this case, the reduction value of the user score by the inappropriate registration may be different between the former user score and the corresponding user score among the latter plurality of subdivided user scores. For example, a large value may be set to the corresponding subdivided user score since an impact thereon is limited. Moreover, a small user score among the user scores may be added to the comment.

As described above, for example, it is possible to reduce the user score in response to so-called 'vandalism' to intentionally do continuous entry of comments as the target for inappropriate registration in a specific movie or movie of a specific category/attribution.

Processing Flow of Third Embodiment

Figure 12:
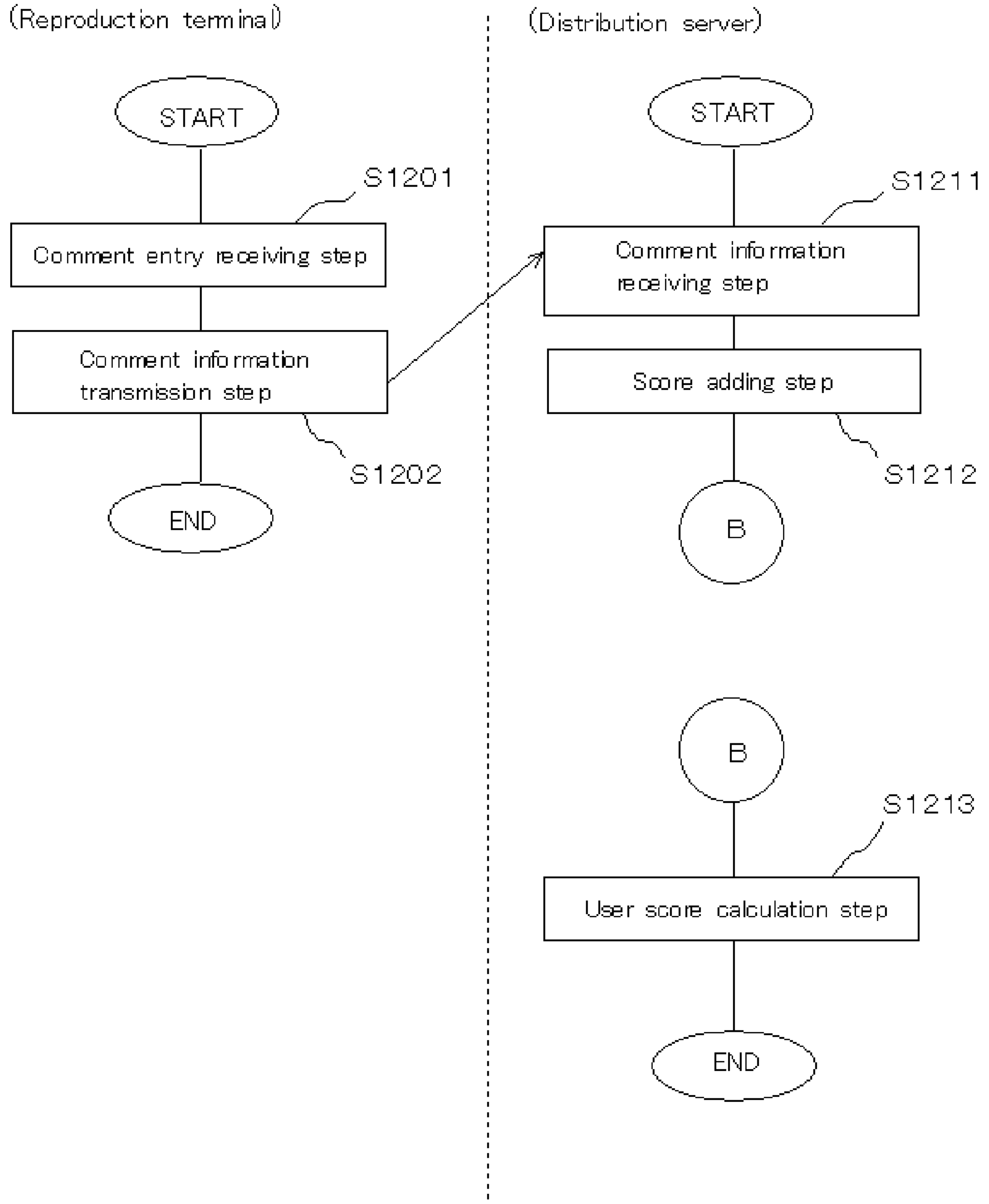
FIG. 12 is a flowchart of the comment distribution system of the second embodiment.

FIG. 12 is a flowchart of the comment distribution system of the third embodiment. Hereinafter, only characteristic process of this embodiment will be described. Note that, the following step may be executed by the respective hardware configurations of a computer as above, or may configure a program, which is stored in a medium and is for controlling the computer.

As shown in FIG. 12, at the outset, the reproduction terminal is provided with the comment entry field etc. in the window, where the movie is currently reproduced, and receives the entry of the comment information, which can be reproduced by interlocking with the distributed movie information (step S1201). Subsequently, the received comment information with the comment user ID is transmitted to the distribution server (step S1202).

Subsequently, the distribution server receives the comment user ID and the comment information (step S1211), and refers the user score storage, where the user ID and the user score indicating the score corresponding to the user ID are correlated and stored, thereby adding the stored user score correlated with the received user ID to the received comment information (step S1212).

Moreover, as described above, the step S1212 is executed in the reproduction terminal. In this case, the reproduction terminal preliminarily (e.g., at login for using service) transmits the user ID of the user of the reproduction terminal to the distribution server. Then, the distribution server transmits the user score of the user stored in the user score storage to the reproduction terminal. When entering the comment in the reproduction terminal, the user score is added as the score for the comment in the reproduction terminal, and transmitted to the distribution server.

Subsequently, as described above, when receiving the inappropriate comment user ID registered by the reproduction terminal, the user score, which has been correlated with the inappropriate comment user ID and stored in the user score storage, is reduced (step S1213), thereby updating the comment score by the user score reduced in the step S1212.

Effects of Third Embodiment

According to the stage production system of the third embodiment, it is possible to set the comment score by utilizing the user score, which is set with respect to each user, and reduced according to the inappropriate comment registration from the viewer user.

Therefore, in the third embodiment, it is possible to set a low score to a comment by the user with many inappropriate registrations at the entry of the comment.

Fourth Embodiment

Outline of Fourth Embodiment

A fourth embodiment is a comment distribution system on the basis of the second embodiment, wherein the user score of the inappropriate comment user is reduced according to the inappropriate word registration.

Functional Configuration of Fourth Embodiment

Figure 13:
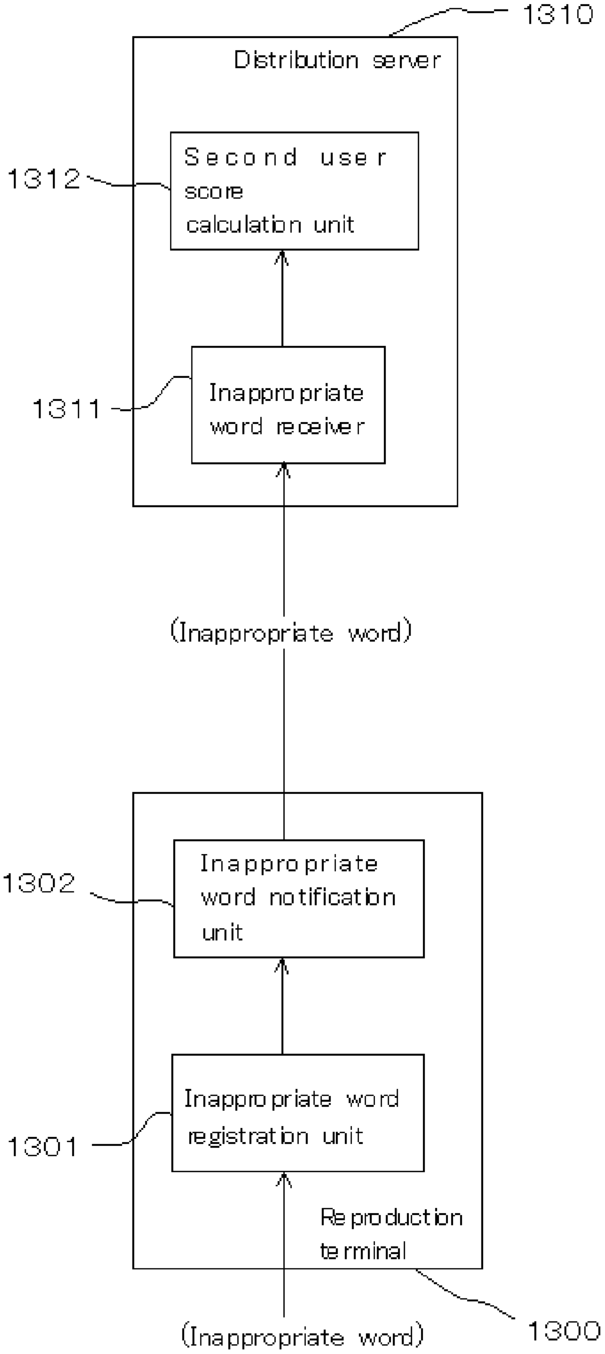
FIG. 13 is a functional block diagram of a comment distribution system of a third embodiment.

FIG. 13 is a functional block diagram of a comment distribution system of a fourth embodiment. As shown in FIG. 13, the comment distribution system of the fourth embodiment is on the basis of the third embodiment, and comprises a ‘reproduction terminal’ (1300), and a ‘distribution server’ (1310). The ‘reproduction terminal’ comprises a ‘inappropriate comment user registration unit’, a ‘inappropriate comment user notification unit’, a ‘score acquisition unit’, a ‘second determination unit’, a ‘comment entry reception unit’ and a ‘comment information transmitter’, and these components are the same as those of the above embodiment, so that descriptions and figures are omitted. The ‘distribution server’ comprises a ‘inappropriate comment user ID receiver’, a ‘second calculation unit’, and a ‘comment information distribution unit, a ‘user score storage’, a ‘comment information receiver’, a ‘score addition unit’, and a ‘user score calculation unit’, and these components are the same as those of the above embodiment, so that descriptions and figures are omitted.

In the comment distribution system of a third embodiment, the reproduction terminal further comprises a ‘inappropriate word registration unit’ (1301), and a ‘inappropriate word notification unit’ (1302), and the distribution server further comprises a ‘inappropriate word receiver’ (1311), and a ‘second user score calculation unit’ (1312). Note that the ‘inappropriate word registration unit’ and the ‘inappropriate word notification unit’, and the ‘inappropriate word receiver’ are the same as those of the first embodiment, so that descriptions thereof are omitted.

The ‘second user score calculation unit’ (1312) has a function of reducing the stored user score correlated with the user ID of a user having entered a comment, including the received inappropriate word, and can be implemented, for example, by a CPU, a main memory, and a user score calculation program.

Specifically, a search of the column of content of comment in the database of FIG. 5 by using the notified inappropriate word as a key, thereby specifying the user ID (comment user ID of the comment) correlated with the searched comment in the database. Subsequently, the user score of the user stored in the user score storage is acquired by using the specified user ID as a key, and reduced.

Moreover, when registering the comment as the inappropriate word in the reproduction terminal, as described in the first embodiment, the comment ID identifying the comment itself may be notified as the inappropriate word. In this case, a search of the column of comment ID in the database of FIG. 5 is executed, and the user ID (comment user ID of the comment) correlated with the corresponding comment ID is specified, thereby reducing the user score identified by the user ID stored in the user score storage as described above. Moreover, the comment score of the user may be simultaneously reduced along with the above reduction.

As described above, the user score and the comment score are reduced according to the inappropriate word registration, the score and the threshold, which is set to each reproduction terminal, are compared, thereby determining display/non-display of the comment with respect to each reproduction terminal.

Processing Flow of Fourth Embodiment

Figure 14:
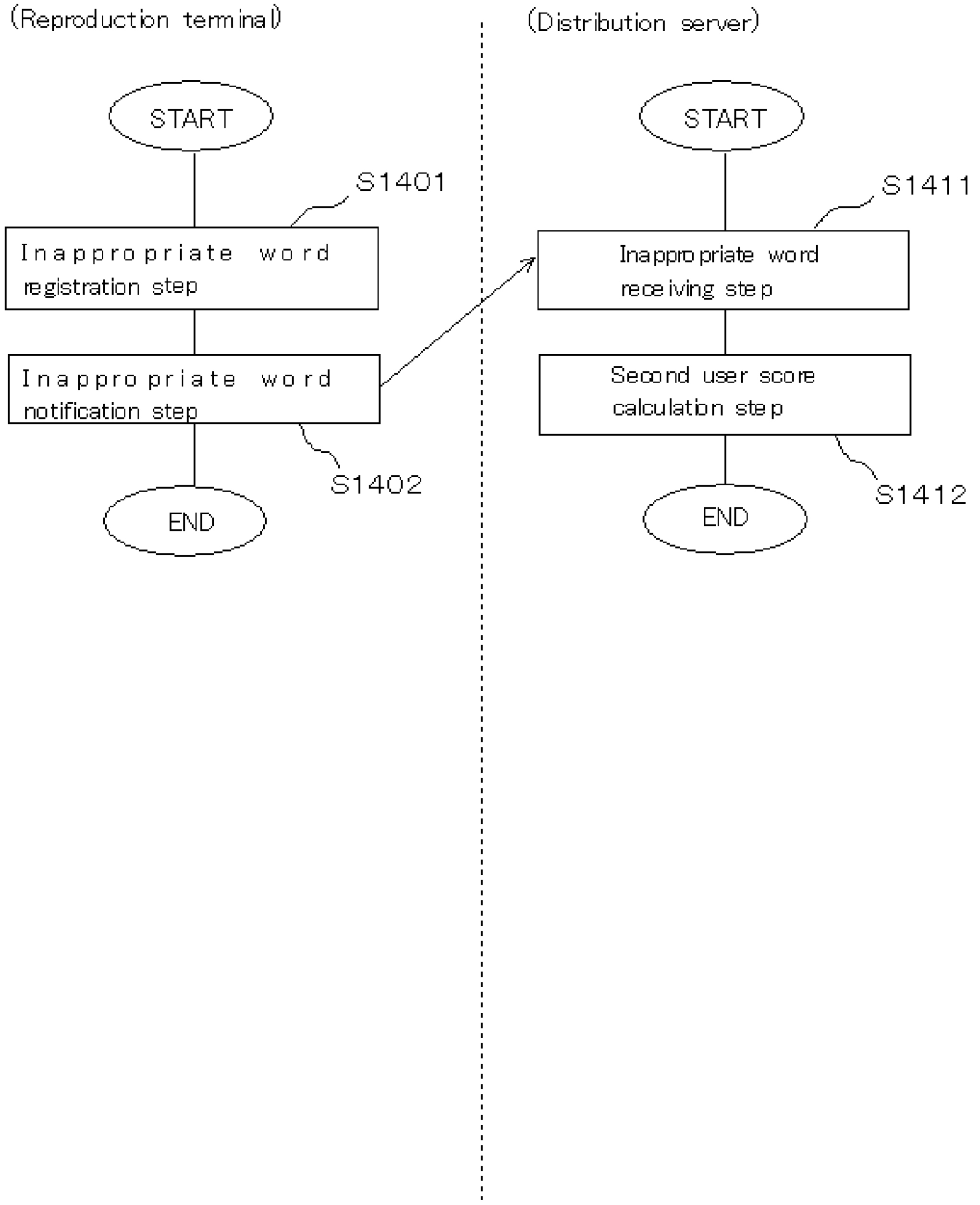
FIG. 14 is a flowchart of the comment distribution system of the second embodiment.

FIG. 14 is a flowchart of the comment distribution system of the fourth embodiment. Hereinafter, only characteristic process of this embodiment will be described. Note that, the following step may be executed by the respective hardware configurations of a computer as above, or may configure a program, which is stored in a medium and is for controlling the computer.

As shown in FIG. 14, at the outset, the inappropriate word registration is received in the reproduction terminal (step S1401). Examples of the registration include a registration by directly designating the comment being currently displayed by interlocking with the movie, a registration by entering the inappropriate word at an arbitrary timing, or a registration by acquiring the inappropriate word from an external inappropriate word dictionary etc. Subsequently, in response to the registration, the registration of the inappropriate word is notified to the distribution server through the ‘Internet communication circuit’ (step S1402).

Moreover, when the all or part of the comment to be displayed by interlocking with the movie is preliminarily distributed to the reproduction terminal, in the reproduction terminal, a search of the distributed all or part of the comment may be executed using the registered inappropriate word as a key, thereby generating a list of comments including the inappropriate word. Moreover, the generated list may be notified to the distribution server as the inappropriate word.

Then, the distribution server receives the inappropriate word (step S1411), and specifies the comment, including the received inappropriate word, by executing a search, thereby searching for the user ID of the user who has entered the specified comment (step S1413). Subsequently, the user score, which has been correlated with the searched user ID and stored in the user score storage, is reduced (step S1412).

Moreover, as described above, when the list of comments including the inappropriate word is transmitted from the reproduction terminal, the distribution server may check the list against the database of the comment stored in the server, thereby determining the comment included in both list and database as the inappropriate word.

Moreover, as described above, when the comment ID identifying the comment itself is notified as the inappropriate word, with reference to the data table of FIG. 5, the user who has entered the comment identified by the ID, may be specified, thereby reducing the user score of the user.

Effects of Fourth Embodiment

According to the stage production system of the fourth embodiment, the user score and the comment score are reduced according to the inappropriate word registration, the score and the threshold, which is set to each reproduction terminal, are compared, thereby determining display/non-display of the comment with respect to each reproduction terminal.

Fifth Embodiment

Outline of Fifth Embodiment

A fifth embodiment is a comment distribution system based on the above embodiments, wherein the reduction of score is executed not for all comments entered by the user α, who is registered as the inappropriate comment user by the viewer user, but for the comment entered by the user α, which is possibly reproduced, for example, within two minutes around the reproduction timing of the comment of the inappropriate registration.

Functional Configuration of Fifth Embodiment

Figure 15:
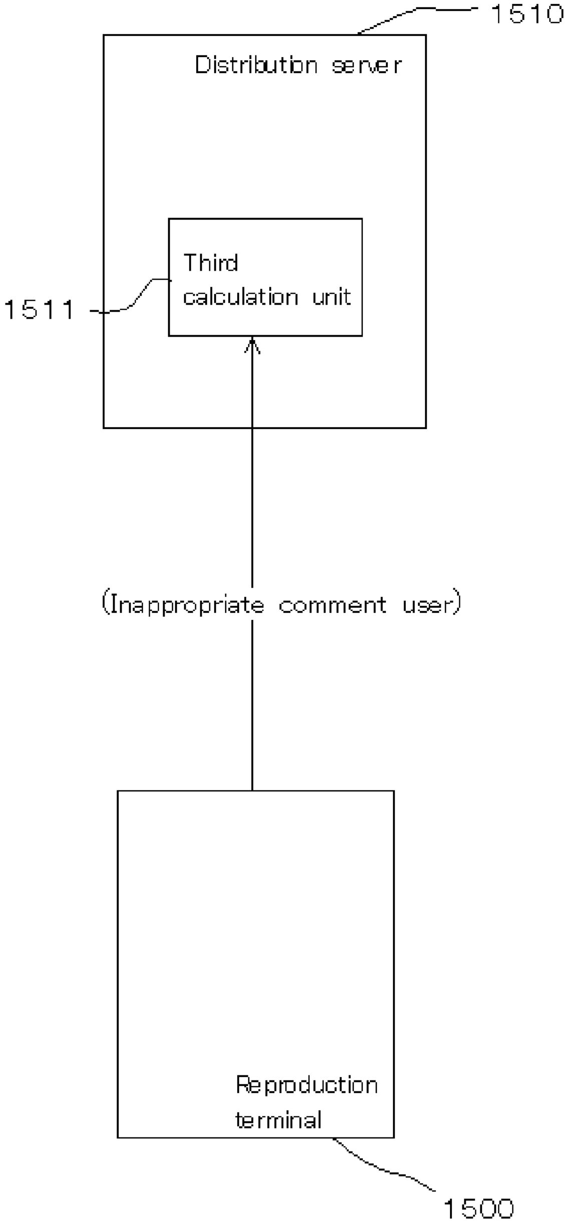
FIG. 15 is a functional block diagram of a comment distribution system of a fourth embodiment.

FIG. 15 is a functional block diagram of a comment distribution system of a fifth embodiment. As shown in FIG. 15, the comment distribution system of the fifth embodiment is on the basis of the above embodiment, and comprises a 'reproduction terminal' (1500), and a 'distribution server' (1510). Note that descriptions and figures of the components of the reproduction terminal and the distribution server described in the above embodiments are omitted.

In the comment distribution system of the fifth embodiment, the distribution server further comprises a 'third calculation unit' (1511).

The 'third calculation unit' (1511) has a function of reducing the score added to a comment from the received inappropriate comment user, the comment possibly being reproduced within a predetermined time frame in the movie including a reproduction timing of the designated comment entered by the inappropriate comment user, and can be implemented, for example, by a CPU, a main memory, and a third calculation program. Note that the determination of the reduction value of the score is the same as in the calculation unit of the first embodiment.

In the third calculation unit, the following specification of the comment as the target for the reduction is executed. When receiving the inappropriate comment user ID registration notification from the reproduction terminal, the information indicating the timing of interlocking reproduction in the movie of the comment, designated at the registration of the comment user, is acquired along with the notification. Subsequently, a search of the comment database of FIG. 5 is executed by using the user ID and the movie ID as keys, thereby extracting comments entered by the user.

Subsequently, from the extracted comments, the comment, which is possibly reproduced within a predetermined time frame such as two minutes around the acquired reproduction timing, is specified with reference to the reproduction timing information in the database. Subsequently, the score of the specified comment is reduced. Moreover, an order of the processes to specify the comment is not limited, and for example, all comments within a predetermined timing in the movie are extracted with reference to the movie ID and the reproduction timing information, and after that, the comment entered by the inappropriate registration may be specified from the comments by utilizing the user ID.

Thus, it is possible to reduce the score of the comment entered by the inappropriate comment user, which is possibly reproduced within a predetermined time frame including a reproduction timing of the registered inappropriate comment.

Note that the 'predetermined time frame including reproduction timing' is not limited. For example, a time frame preliminarily determined as 'two minutes around the timing', and a time frame calculated by a predetermined formula on the basis of the user score of the inappropriate comment user, or the use score of the user who has done the registration may be allowed. Moreover, it is possible to divide the movie into a plurality of scenes according to analysis of scenes in the movie, and on the basis of one scene (a set of a plurality of frames) as a unit, to determine a time frame indicating the one scene including a reproduction timing of the registered inappropriate comment.

Moreover, in the fifth embodiment, as after-mentioned seventh embodiment, the 'predetermined time frame including reproduction timing' may not be consecutive reproduction sections, and may be separated reproduction sections, which can be a set of similar scenes. Moreover, in place of the predetermined time frame, conditions other than time such as a 'predetermined position' may be used for specifying the comment as the target for reducing the score according to the inappropriate registration.

Processing Flow of Fifth Embodiment

Figure 16:
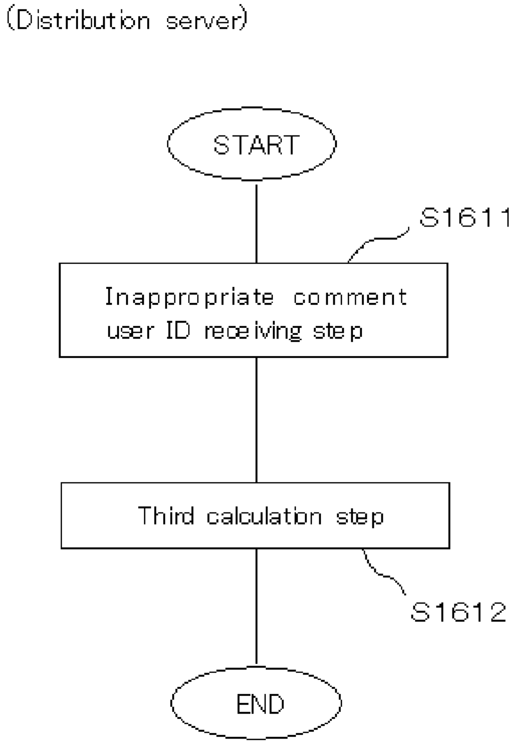
FIG. 16 is a flowchart of the comment distribution system of the fourth embodiment.

FIG. 16 is a flowchart of the comment distribution system of the fifth embodiment. Hereinafter, only characteristic process of this embodiment will be described. Note that, the following step may be executed by the respective hardware configurations of a computer as above, or may configure a program, which is stored in a medium and is for controlling the computer.

As shown in FIG. 16, the distribution server receives the inappropriate comment user ID registration notification (step S1611). Subsequently, the comment information entered by the inappropriate comment user, which is possibly reproduced within a predetermined time frame in the movie including a reproduction timing of the designated comment entered by the received inappropriate comment user, is specified, thereby reducing the score added to the comment information (step S1612).

Effects of Fifth Embodiment

According to the stage production system of the fifth embodiment, it is possible to reduce the score of the comment entered by the inappropriate comment user, which is possibly reproduced within a predetermined time frame including a reproduction timing of the registered inappropriate comment.

Sixth Embodiment

Outline of Sixth Embodiment

A sixth embodiment is a comment distribution system on the basis of the above embodiments, wherein when the user α is registered as the inappropriate comment user, it is possible to specify a comment, including the same word used in the designated comment A, among comments entered by other users within a predetermined time frame such as two minutes around a reproduction timing of the designated comment A. Subsequently, the user score of the user, who has entered the specified comment, is reduced.

Functional Configuration of Sixth Embodiment

Figure 17:
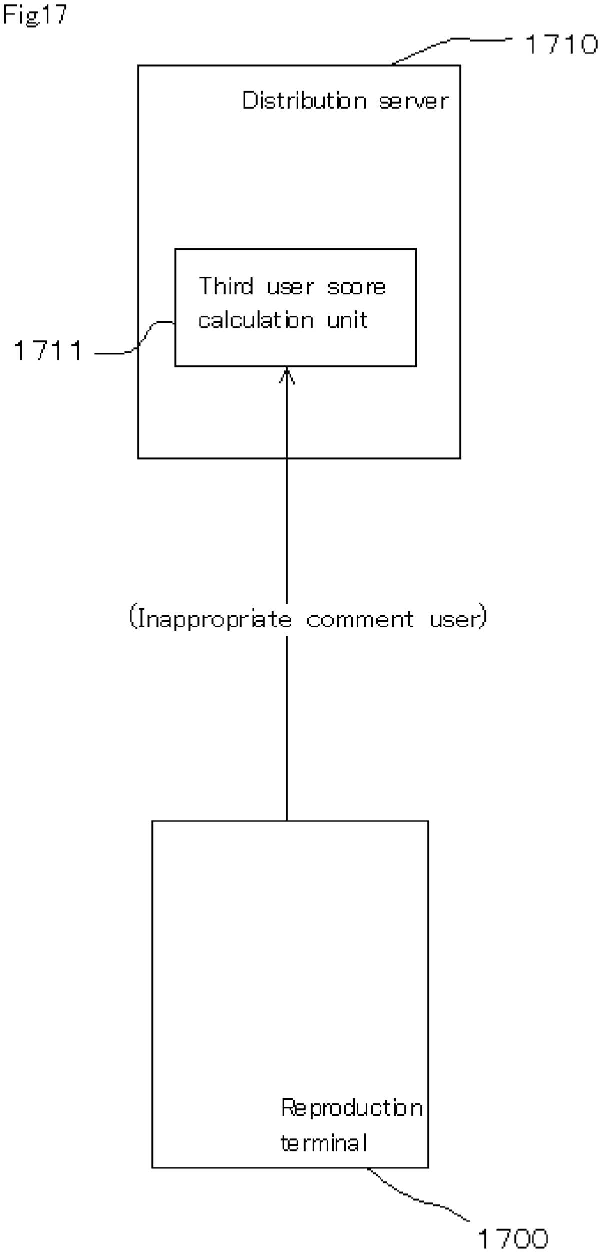
FIG. 17 is a functional block diagram of a comment distribution system of a fifth embodiment.

FIG. 17 is a functional block diagram of a comment distribution system of a sixth embodiment. As shown in FIG. 17, the comment distribution system of the sixth embodiment is on the basis of the above embodiment, and comprises a 'reproduction terminal' (1700), and a 'distribution server' (1710). Note that descriptions and figures of the components of the reproduction terminal and the distribution server described in the above embodiments are omitted.

In the comment distribution system of the sixth embodiment, the distribution server further comprises a 'third user score calculation unit' (1711).

The 'third user score calculation unit' (1711) has a function of reducing the stored user score correlated with the user ID of a user having entered a comment, including the word used in the designated comment, the comment possibly being reproduced within a predetermined time frame in the movie including a reproduction timing of the designated comment entered by the received inappropriate comment user, and can be implemented, for example, by a CPU, a main memory, and a third user score calculation program. Note that the determination of the reduction value of the user score is the same as in the respective calculation units of the above embodiments.

Moreover, in the third user score calculation unit, the following specification of the comment as the target for the reduction is executed. When receiving the inappropriate comment user ID registration notification from the reproduction terminal, the information indicating the timing of interlocking reproduction in the movie of the comment, designated at the registration of the comment user, is acquired along with the notification. Subsequently, a search of the comment database of FIG. 5 is executed by using the movie ID and the content of comment as keys, thereby extracting comments having the same content as the comment, designated at the registration of the inappropriate comment user.

Subsequently, from the extracted comments, the comment, which is possibly reproduced within a predetermined time frame such as two minutes around the acquired reproduction timing, is specified with reference to the reproduction timing information in the database. Subsequently, the score, stored in the user score storage, of the user, who has entered the specified comment, is reduced.

Note that the 'predetermined time frame including reproduction timing' is not limited, and may be various time frames as described in the fifth embodiment.

Thus, it is possible to reduce the user score of the user, who has entered the comment having the same content as the comment A, among comments entered within a predetermined time frame including a reproduction timing of the comment A designated for registration of the inappropriate comment user.

Processing Flow of Sixth Embodiment

Figure 18:
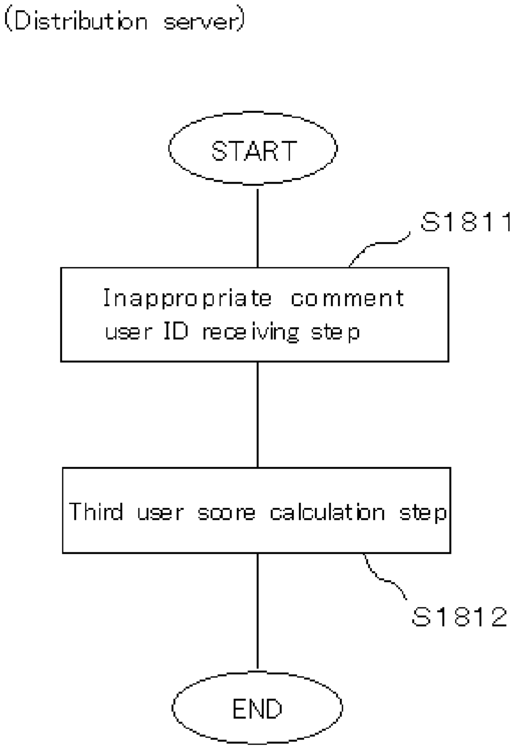
FIG. 18 is a flowchart of the comment distribution system of the fifth embodiment.

FIG. 18 is a flowchart of the comment distribution system of the sixth embodiment. Hereinafter, only characteristic process of this embodiment will be described. Note that, the following step may be executed by the respective hardware configurations of a computer as above, or may configure a program, which is stored in a medium and is for controlling the computer.

As shown in FIG. 18, the distribution server receives the inappropriate comment user ID registration notification (step S1811). Subsequently, the comment, which is possibly reproduced within a predetermined time frame in the movie including a reproduction timing of the designated comment entered by the received inappropriate comment user, is specified, thereby extracting comments including the word in the designated comment, and reducing the stored user score, which has been correlated with the user ID of the user who has entered the extracted comment (step S1812).

Moreover, as described above, the list of comments including the inappropriate word may be transmitted from the reproduction terminal. In this case, the distribution server may check the list against the database of the comment stored in the server, thereby determining the comment included in both list and database as the inappropriate word, and reducing the user score correlated with the inappropriate word.

Effects of Sixth Embodiment

According to the stage production system of the sixth embodiment, it is possible to reduce the user score of the user, who has entered the comment having the same content as the comment A, among comments entered within a predetermined time frame including a reproduction timing of the comment A designated for registration of the inappropriate comment user.

Seventh Embodiment

Outline of Seventh Embodiment

A seventh embodiment is a comment distribution system on the basis of the above embodiments having the following features. There can be cases where the word 'die' is generally improper to one scene, but not improper to another scene. In the comment distribution system of the seventh embodiment, the reduction of score is executed only for the comment including the word 'die', which has been entered within a predetermined time frame in the movie including an interlocking reproduction timing of the comment of inappropriate registration, including the word 'die'.

Figure 19:
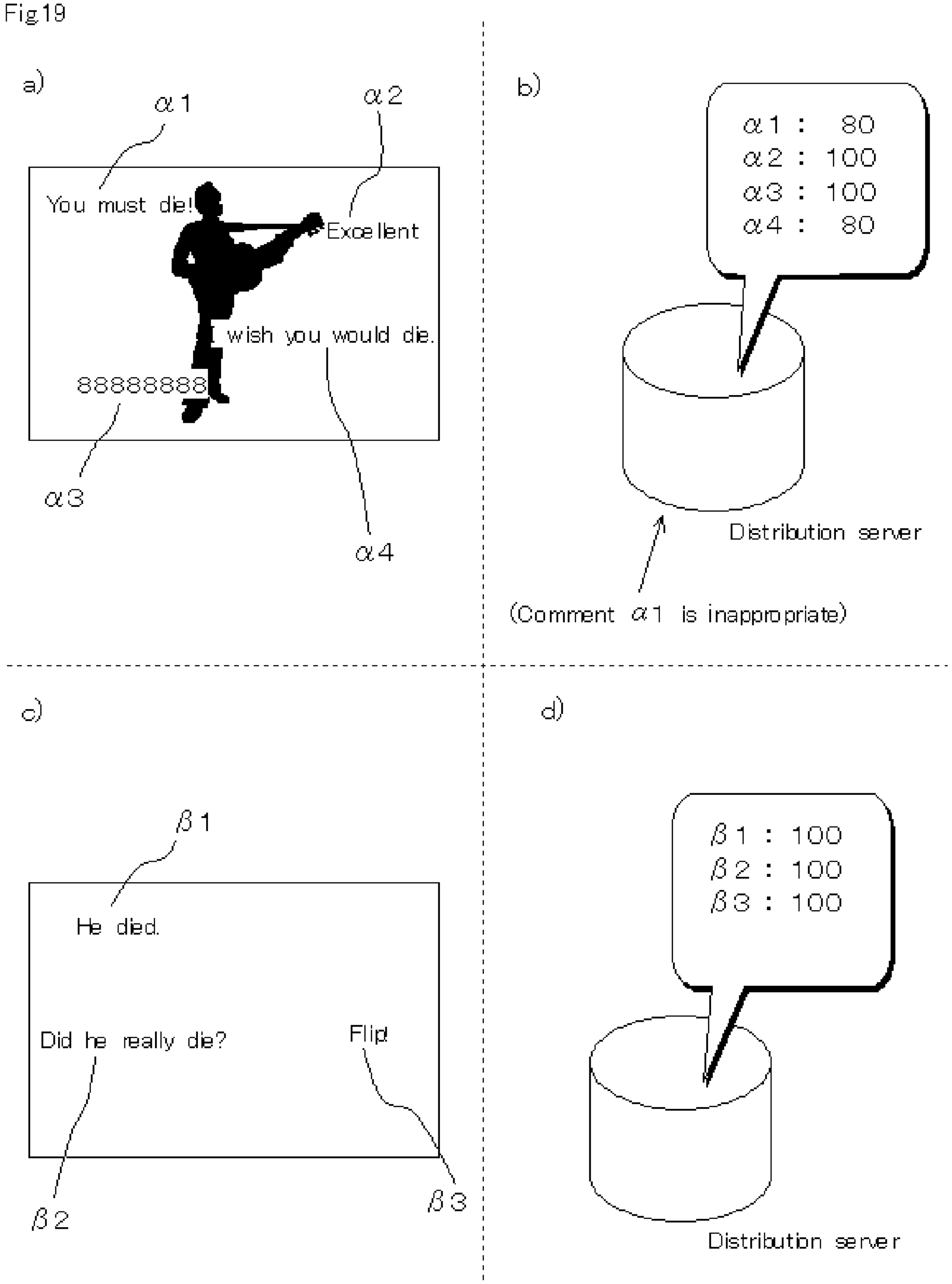
FIG. 19 is a conceptual diagram exemplifying reduction of comment score in a comment distribution system of a seventh embodiment.

FIG. 19 is a conceptual diagram exemplifying reduction of comment score in a comment distribution system of a seventh embodiment. As shown in FIG. 19 (*a*), in one scene in a distributed movie, interlocking display of comments α 1 to 4 with score, entered by the user, is executed. When inappropriate registrations for the comment α 1 'die', which is a libelous comment to a cast in this scene, are done by many users, as shown in FIG. 19 (*b*), the comment score of the comment α 1 is reduced from the initial value '100' to '80'.

Moreover, along with this, from the comments possibly reproduced within the predetermined time frame in the movie including an interlocking reproduction timing (e.g., 8 seconds around the reproduction timing), the comment α 4 'I wish you would die', including the same inappropriate word 'die' in the comment α 1, is specified, and the comment score of the comment α 4 is also reduced to '80' (even if the comment α 4 is not the target for the inappropriate registration by the user).

Meanwhile, as shown in FIG. 19 (*c*), the cast dies in a scene after five minutes from the above scene in the story of this movie, and comments β 1 and 2, including word 'die' having no relation with libelousness, are entered and interlocking display is executed in this scene. In this embodiment, the comments β 1 to 3, which are reproduced outside the predetermined time frame in the movie including the interlocking reproduction timing of the comment α 1, are not the targets for the reduction of the score according to the inappropriate registration of the comment α 1. Therefore, as shown in FIG. 19 (*d*), in the seventh embodiment, even when the comment α 1 is registered as inappropriate, it is possible to retain the score '100' of the comments β 1 and 2.

Functional Configuration of Seventh Embodiment

Figure 20:
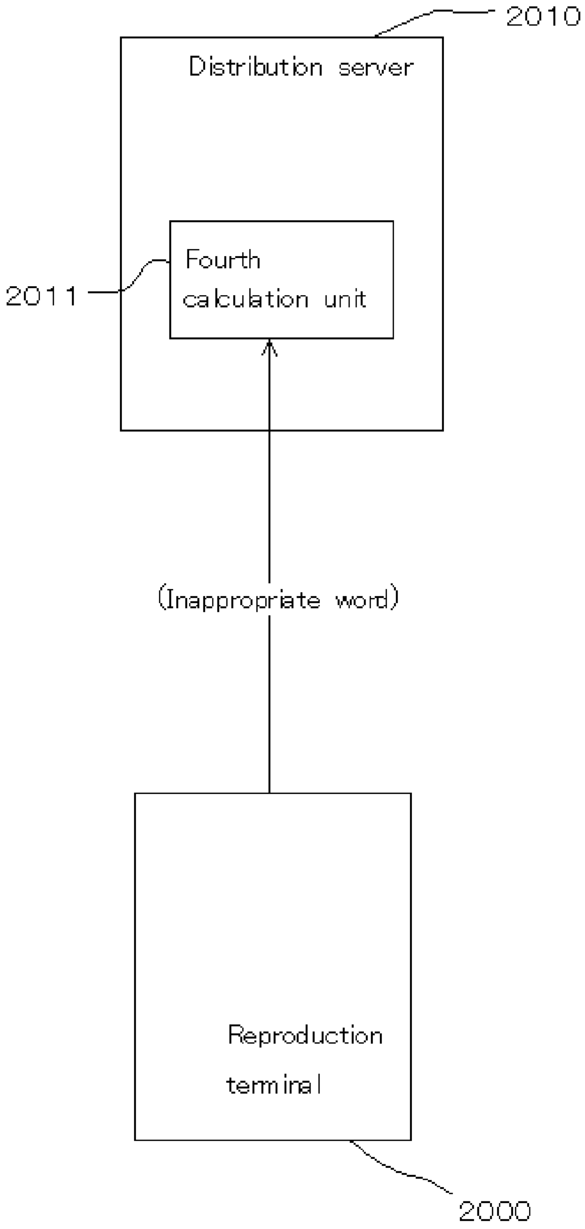
FIG. 20 is a functional block diagram of the comment distribution system of the seventh embodiment.

FIG. 20 is a functional block diagram of a comment distribution system of a seventh embodiment. As shown in FIG. 20, the comment distribution system of the seventh embodiment is on the basis of the above embodiment, and comprises a 'reproduction terminal' (2000), and a 'distribution server' (2010). Note that descriptions and figures of the components of the reproduction terminal and the distribution server described in the above embodiments are omitted.

In the comment distribution system of the seventh embodiment, the distribution server further comprises a 'fourth calculation unit' (2011).

The 'fourth calculation unit' (2011) has a function of reducing the score added to a comment, including the inappropriate word, the comment possibly being reproduced within a predetermined time frame in the movie including a reproduction timing of the received inappropriate word, and can be implemented, for example, by a CPU, a main memory, and a fourth calculation program. Note that the determination of the reduction value of the score is the same as in the respective calculation units of the above embodiments.

Moreover, in the fourth calculation unit, the following specification of the comment as the target for the reduction is executed. When receiving the inappropriate word registration notification from the reproduction terminal, a search of the database of FIG. 5 is executed, thereby specifying the information indicating a timing of reproducing the designated comment. The information, indicating the timing of interlocking reproduction in the movie of the comment, may be acquired along with the notification from the reproduction terminal.

Subsequently, a search of the comment database of FIG. 5 is executed by using the movie ID and the text data indicating the registered inappropriate word as keys, thereby extracting comments including the inappropriate word in the movie. Subsequently, from the extracted comments, the comment, which is possibly reproduced within a predetermined time frame such as two minutes around the acquired reproduction timing, is specified with reference to the reproduction timing information in the database, thereby reducing the score of the specified comment.

Note that the 'predetermined time frame including reproduction timing' is not limited, and may be various time frames as described in the fifth embodiment.

Moreover, in the above processing, when the one user separately did the inappropriate word registrations for the respective comments α 1 and 4, the scores of both comments are doubly reduced. Therefore, the user ID of the user who has executed the inappropriate word registration is referred, and when the user IDs are identical, the reduction for the latter inappropriate word registration may be omitted.

Thus, among the comments including the registered inappropriate word, it is possible to reduce only the score of the comment, which is possibly reproduced within a predetermined time frame in the movie including the reproduction timing of the comment of inappropriate registration. Therefore, it is possible to prevent the reduction of the comment score, for example, when the inappropriate word is not improper in a different scene.

Other Example

Moreover, in the seventh embodiment, it is possible to utilize the following 'predetermined time frame including the reproduction timing' for narrowing the comment and reducing the score thereof. For example, the distributed movie is categorized as 'performance scene 1', 'talking scene 1', 'performance scene 2', 'other scene 1', and 'talking scene 2' etc, and identification information of the category of the scene and information of reproduction section indicating the reproduction time (starting time and ending time of reproduction) of the scene are correlated. Subsequently, the same identification information is assigned to similar scenes (e.g., one scene ID is assigned to the 'performance scene 1' and 'performance scene 2'), thereby generating and managing table data.

Subsequently, when the inappropriate registration of the comment is done, it is possible to specify not only the scene including the comment of registration (e.g., the performance scene 1), but also the performance scene 2 located away from the scene is also specified as the similar scene with reference to the above table data. Subsequently, among the comments included in the performance scenes 1 and 2, the comment including the same word in the comment of inappropriate registration is specified, thereby reducing the score.

Moreover, a 'predetermined position' may be used for reducing the score according to the inappropriate registration in place of the predetermined time. For example, it is possible to acquire information indicating a display position on the movie of the comment of inappropriate registration from the reproduction terminal. Moreover, it is possible to manage the information of display position of the comment as 'comment ID—display position database' in the distribution server, thereby specifying the display position of the comment of inappropriate registration from the database.

Subsequently, a search of the database by using the display position as a key is executed, thereby specifying the comment displayed at the nearly same position as the comment of inappropriate registration, or the comment displayed at the nearly same position in a different reproduction time. Subsequently, the comment score or the user score for the specified comment is reduced.

Thus, for example, in the movie with caption corresponding to sound displayed in the lower portion, once inappropriate registration is done for the comment overlapping with the caption, it is possible to reduce the score of the comment similarly displayed in the lower portion.

Processing Flow of Seventh Embodiment

Figure 21:
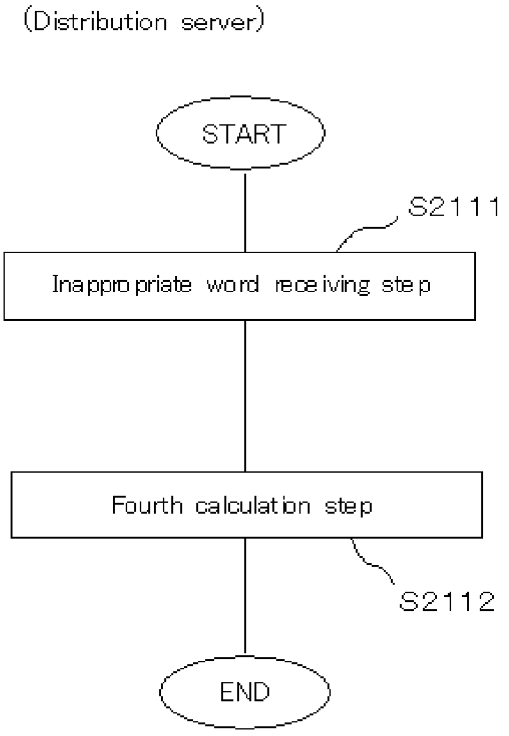
FIG. 21 is a flowchart of the comment distribution system of the seventh embodiment.

FIG. 21 is a flowchart of the comment distribution system of the seventh embodiment. Hereinafter, only characteristic process of this embodiment will be described. Hereinafter, only characteristic process of this embodiment will be described. Note that, the following step may be executed by the respective hardware configurations of a computer as above, or may configure a program, which is stored in a medium and is for controlling the computer.

As shown in FIG. 21, the distribution server receives the inappropriate registration notification (step S2111). Subsequently, the comment, which is possibly reproduced within a predetermined time frame in the movie including a reproduction timing of the received inappropriate word, is specified, thereby reducing the score added to the comment including the word among the specified comments (step S2112).

Effects of Seventh Embodiment

According to the stage production system of the seventh embodiment, among the comments including the registered inappropriate word, it is possible to reduce only the score of the comment, which is possibly reproduced within a predetermined time frame in the movie including the reproduction timing of the comment of inappropriate registration. Therefore, it is possible to prevent the reduction of the comment score, for example, when the inappropriate word is not improper in a different scene.

Eighth Embodiment

Outline of Eighth Embodiment

An eighth embodiment is a comment distribution system on the basis of the above embodiment, wherein user ID of the viewer, who has done the inappropriate registration or the inappropriate comment user registration is acquired, thereby setting different score reduction value according to a rank of the user as a member of a service.

Therefore, it is possible to differentiate the user, for example, the user, who is a high-rank member of the comment distribution service, and has high level of contribution and understanding, may have strong influence on the reduction of comment score.

Functional Configuration of Eighth Embodiment

Figure 22:
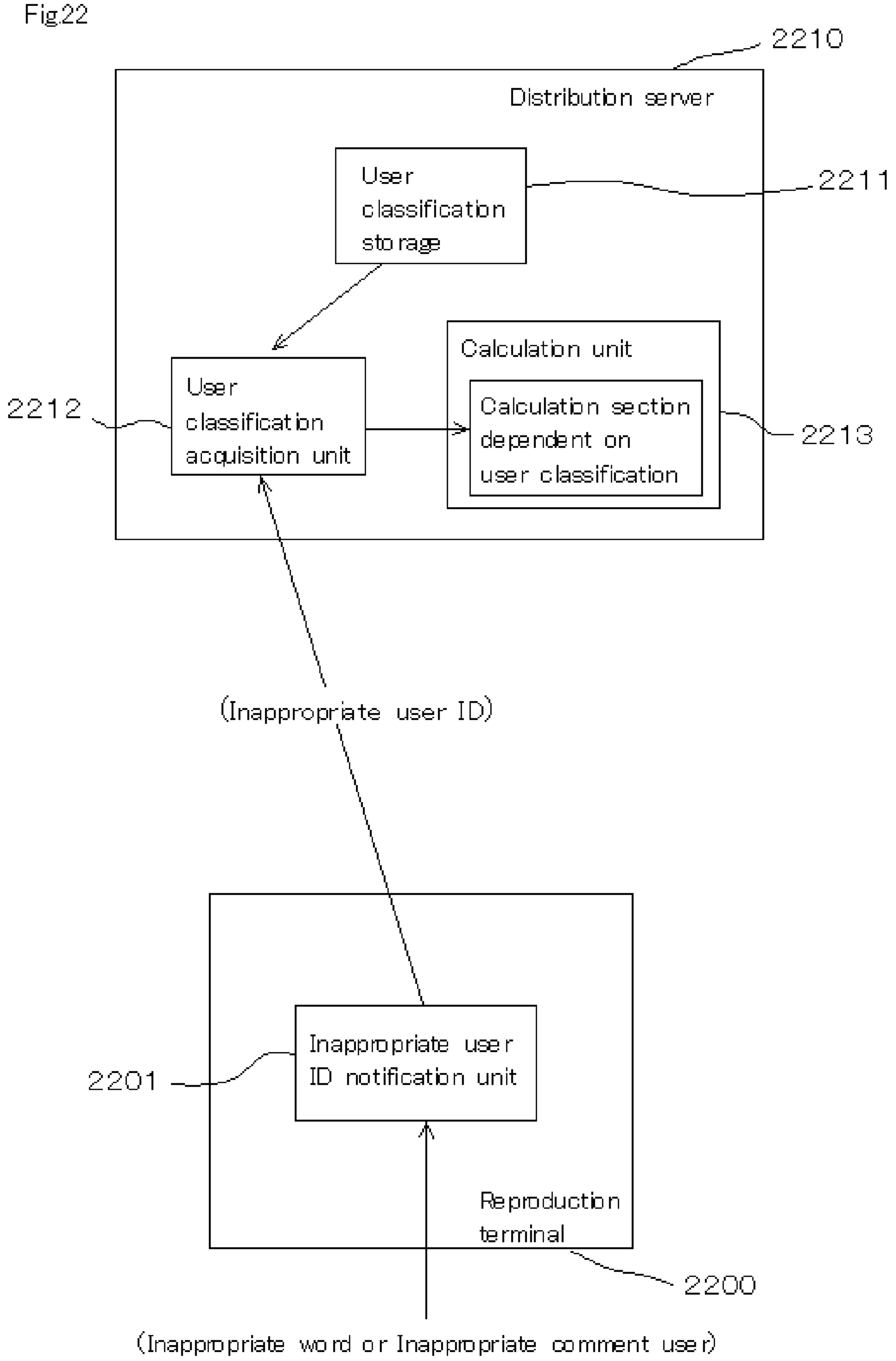
FIG. 22 is a functional block diagram of a comment distribution system of an eighth embodiment.

FIG. 22 is a functional block diagram of a comment distribution system of an eighth embodiment. As shown in FIG. 22, the comment distribution system of the eighth embodiment is on the basis of the above embodiment, and comprises a 'reproduction terminal' (2200), and a 'distribution server' (2210). Note that descriptions and figures of the components of the reproduction terminal and the distribution server described in the above embodiments are omitted.

In the comment distribution system of the eighth embodiment, the reproduction terminal further comprises a 'inappropriate user ID notification unit' (2201), and the distribution server further comprises a 'user classification storage' (2211), a 'user classification acquisition unit' (2212), and the first or second calculation unit further comprises a 'calculation section dependent on user classification'.

The 'inappropriate user ID notification unit' (2201) has a function of notifying the user ID, designated by the inappropriate word notification unit or the inappropriate comment user notification unit, and can be implemented, for example, by a CPU, a main memory, and an inappropriate user ID notification program.

The 'user classification storage' (2211) has a function of correlating and storing the user ID and a user classification identified by the user ID, and can be implemented, for example, by various storages such as a flash memory or a HDD. Note that the 'user classification' is information indicating classification FIG. 23 is an illustration of a table data stored in a user classification storage. Note that this table data includes the table data of the user score storage. As shown in FIG. 23, the user ID, the user classification information such as membership, and the use score are correlated, and stored. It is possible to specify the user classification and the user score with reference to such table data by using the user ID as a key.

The 'user classification acquisition unit' (2212) has a function of acquiring the stored user classification on a basis of the user ID notified along with the inappropriate word notification or the inappropriate comment user notification, and can be implemented, for example, by a CPU, a main memory, and a user classification acquisition program. Specifically, as shown in FIG. 23, a search of the column of user ID by using the user ID as a key is executed, thereby acquiring the user classification of the user.

The 'calculation section dependent on user classification' (2213) has a function of calculating reduction value of the score to be reduced on a basis of the acquired user classification, and can be implemented, for example, by a CPU, a main memory, and a program for reduction dependent on user classification, stored in the first or second calculation program.

Specifically, the reduction value of each user classification is preliminarily determined, for example, the reduction value (basic value) '5' for a senior member, and '2' for a general member are set, and stored in the flash memory, thereby acquiring the reduction value by using the user classification as a key. Moreover, for the basic value, for example, it is possible to execute various adjustments such as an adjustment using weighting value calculated from the user score of the user, thereby calculating the final reduction value.

Processing Flow of Eighth Embodiment

Figure 24:
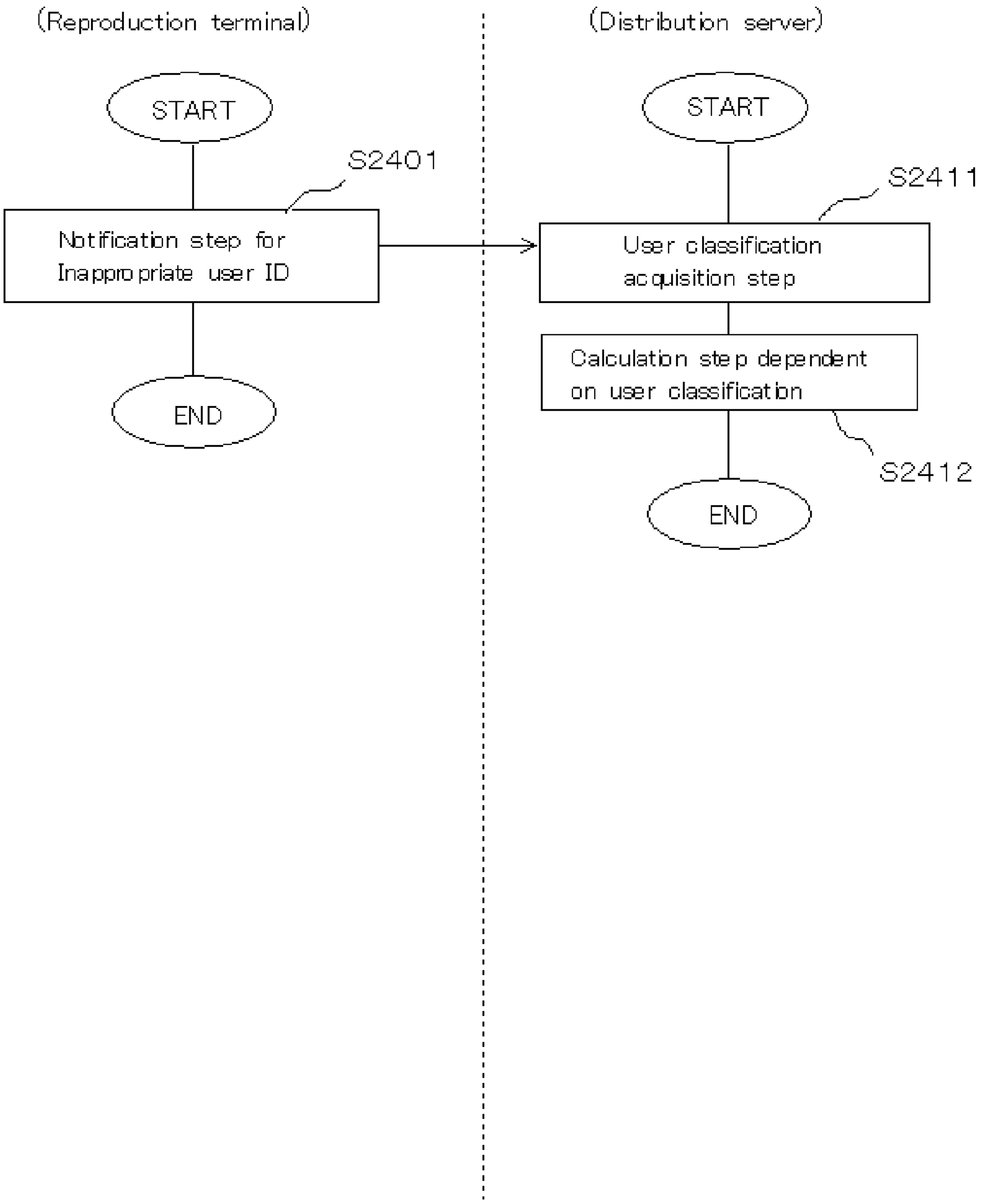
FIG. 24 is a flowchart of the comment distribution system of the eighth embodiment.

FIG. 24 is a flowchart of the comment distribution system of the eighth embodiment. Hereinafter, only characteristic process of this embodiment will be described. Note that, the following step may be executed by the respective hardware configurations of a computer as above, or may configure a program, which is stored in a medium and is for controlling the computer.

As shown in FIG. 24, the inappropriate word and the user ID of the user who has designated the inappropriate comment user, are notified from the reproduction terminal to the distribution server (step S2401). Subsequently, the distribution server acquires the user classification, which has been correlated with the user ID and stored in the user classification storage (step S2411). Subsequently, the reduction value of the score is calculated on the basis of the acquired user classification (step S2412).

Effects of Eighth Embodiment

According to the stage production system of the eighth embodiment,

It is possible to calculate the score reduction value according to a rank of the user as a member of a service etc, who has done the inappropriate registration or the inappropriate comment user registration.

Therefore, it is possible to differentiate the user, for example, the user, who is a high-rank member of the comment distribution service, and has high level of contribution and understanding, may have strong influence on the reduction of comment score.

Ninth Embodiment

Outline of Ninth Embodiment

A ninth embodiment is a comment distribution system on the basis of the above embodiment, wherein the user score is stored with respect to each movie, and upon the inappropriate word registration, the reduction of the user score is executed with respect to each movie Therefore, for example, the user α as a dancer enters many appropriate advice comments for the dance movie A, and most of them are not registered as inappropriate. Meanwhile, the user repeatedly enters comments of bad language against teams other than his favorite team for the sports movie B, and many of them are registered as inappropriate. In the comment distribution system of the ninth embodiment, as to the user α, the user score '100' for the movie A and the user score '10' for the movie B are stored.

Thus, for example, it is possible to appropriately manage the user score of the user, who has different tendency depending on the move. Therefore, it is possible to prevent non-display of a good comment for a movie due to a low score caused by inappropriate registration of a comment for another movie.

Functional Configuration of Ninth Embodiment

Figure 26:
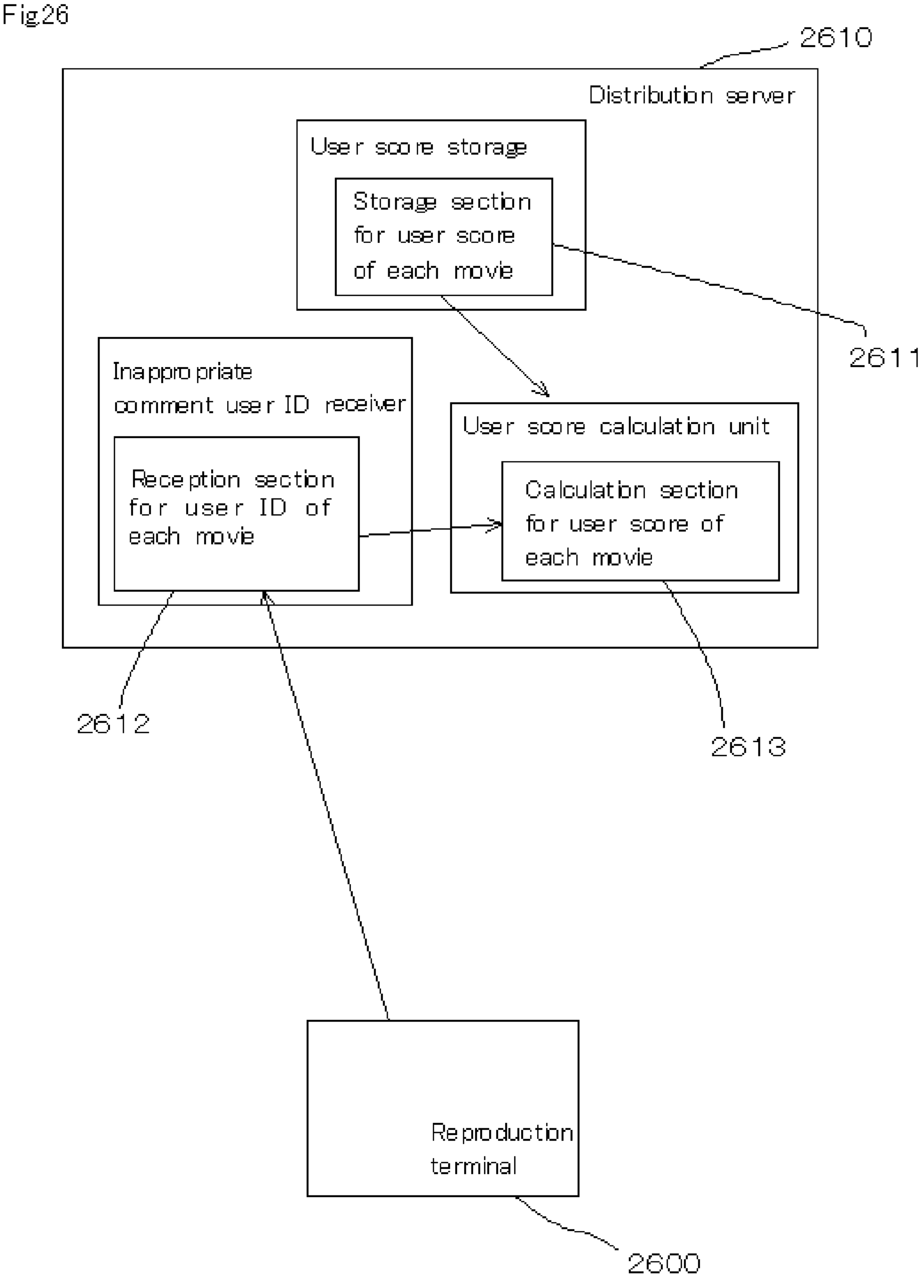
FIG. 26 is a functional block diagram of a comment distribution system of a ninth embodiment.

FIG. 26 is a functional block diagram of a comment distribution system of a ninth embodiment. As shown in FIG. 26, the comment distribution system of the ninth embodiment is on the basis of the third embodiment, and comprises a 'reproduction terminal' (2600), and a 'distribution server' (2610).

The reproduction terminal comprises a 'inappropriate comment user registration unit', a 'inappropriate comment user notification unit', a 'score acquisition unit', a 'second determination unit', a 'comment entry reception unit' and a 'comment information transmitter', and these components are the same as those of the above embodiment, so that descriptions and figures are omitted. The distribution server comprises a 'inappropriate comment user ID receiver', a 'second calculation unit', and a 'comment information distribution unit, a 'user score storage', a 'comment information receiver', a 'score addition unit', and a 'user score calculation unit', and these components are the same as those of the above embodiment, so that descriptions and figures are omitted.

In the comment distribution system of the ninth embodiment, the user score storage of the distribution server further comprises a 'storage section for user score of each movie' (2611), the inappropriate comment user ID receiver further comprises a 'reception section for user ID of each movie' (2612), and the user score calculation unit further comprises a 'calculation section for user score of each movie' (2613).

The 'storage section for user score of each movie' (2611) has a function of correlating and storing the user ID and the user score corresponding to the user ID with respect to each movie, and can be implemented, for example, by various storages such as a flash memory and a HDD.

FIG. 27 is an illustration of storing user score with respect to each movie. As shown in FIG. 27, for example, for the movie identified by the movie ID 'HvsM', the users respectively identified by the user IDs 'GoGoHawk', 'Yakyu_suki', 'Dragons', and 'Homerun' enter the comments, and the user scores for each movie '100', '50', '80', and '100' are correlated with respect to each user ID. Meanwhile, the user scores '100', '80', and '90' of the users identified by the respective user IDs 'Yakyu_suki', 'Hophip', and 'WWaltz' are correlated with the movie B identified by the movie ID '12dCE', and stored.

Moreover, in this storage section for user score of each movie, it is possible to store only the user score with limited number and/or less than or equal to a predetermined value. For example, only 500 user scores may be stored, or only 500 users having low order user score may be stored.

The 'reception section for user ID of each movie' (2612) has a function of receiving the inappropriate comment user ID with respect to each movie, and can be implemented, for example, by a communication circuit for connecting to the internet etc, a CPU, a main memory, and a reception program for user ID of each movie. Note that the concrete function is basically the same excluding the correlation between the inappropriate comment user ID and the movie ID, so that the description is omitted.

Note that in order to receive the inappropriate comment user ID correlated with the movie ID, the reproduction terminal may acquire and correlate the movie ID of the movie, having relation with the comment, upon transmitting the comment of inappropriate registration and the user ID.

The 'calculation section for user score of each movie' (2613) has a function of reducing the user score, correlated with the received inappropriate comment user ID and stored in the user score storage, with respect to each movie, and can be implemented, for example, by a CPU, a main memory, and a calculation program for user score of each movie. Note that this calculation is the same as the above calculation of the user score excluding that the calculation is executed with respect to each movie using the movie ID, so that the description is omitted.

Thus, in the comment distribution system of the ninth embodiment, for example, as to the user 'Yakyu_suki', the inappropriate registration for the comment 1 for the movie A, and the inappropriate registration for the comment 2 for the movie B are distinctively received, and the reduction is distinctively executed by the use score 'Yakyu_suki' stored with respect to each movie, thereby managing the user score of each user with respect to each movie.

Processing Flow of Ninth Embodiment

Figure 28:
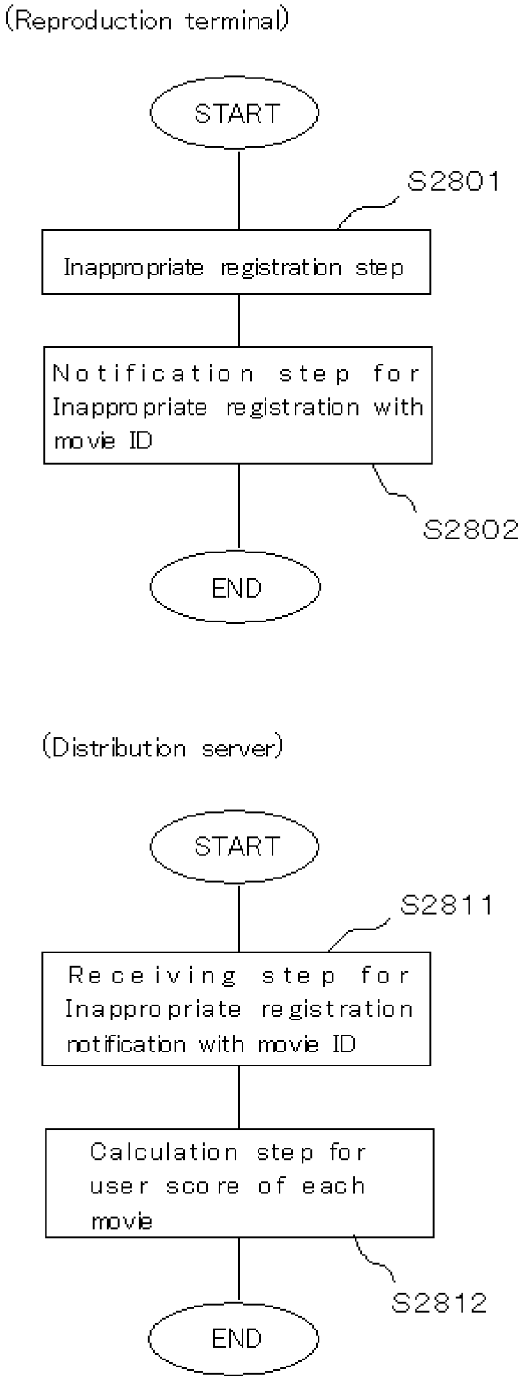
FIG. 28 is a flowchart of the comment distribution system of the ninth embodiment.

FIG. 28 is a flowchart of the comment distribution system of the ninth embodiment. Hereinafter, only characteristic process of this embodiment will be described. Note that, the following step may be executed by the respective hardware configurations of a computer as above, or may configure a program, which is stored in a medium and is for controlling the computer.

As shown in FIG. 28, at the outset, the reproduction terminal receives inappropriate registration for the comment displayed by interlocking with the movie or the inappropriate comment user registration (step S2801). Subsequently, in response to the registration, the notification of the registration correlated with the movie ID of the movie as a target for the comment of inappropriate registration is transmitted to the distribution server (step S2802).

When receiving the notification (step S2811), the distribution server specifies the user score of the user for the movie from the preliminarily stored user scores for each movie by using the inappropriate comment user ID and the movie ID, indicated by the notification, thereby reducing the score (step S2812).

Subsequently, as described in the above embodiment, in response to the distribution request for the movie from the reproduction terminal, the distribution server distributes comment information, displayed by interlocking with the movie, with the score on the basis of the user score for each movie.

Effects of Ninth Embodiment

According to the stage production system of the ninth embodiment, it is possible to appropriately manage the user score of the user, who has different tendency depending on the move. Therefore, it is possible to prevent non-display of a good comment for a movie due to a low score caused by inappropriate registration of a comment for another movie.

Tenth Embodiment

Outline of Tenth Embodiment

In the comment distribution system of the above embodiment, the more comments for movies the user enters, the more chances of inappropriate registrations and score reductions. Therefore, the user possibly loses his incentive to enter many comments.

In order to solve this, in a comment distribution system of a tenth embodiment, number of comment entries by the user is counted, and according to the counted number, the reduced user score can be recovered (a predetermined score is increased).

Functional Configuration of Tenth Embodiment

Figure 29:
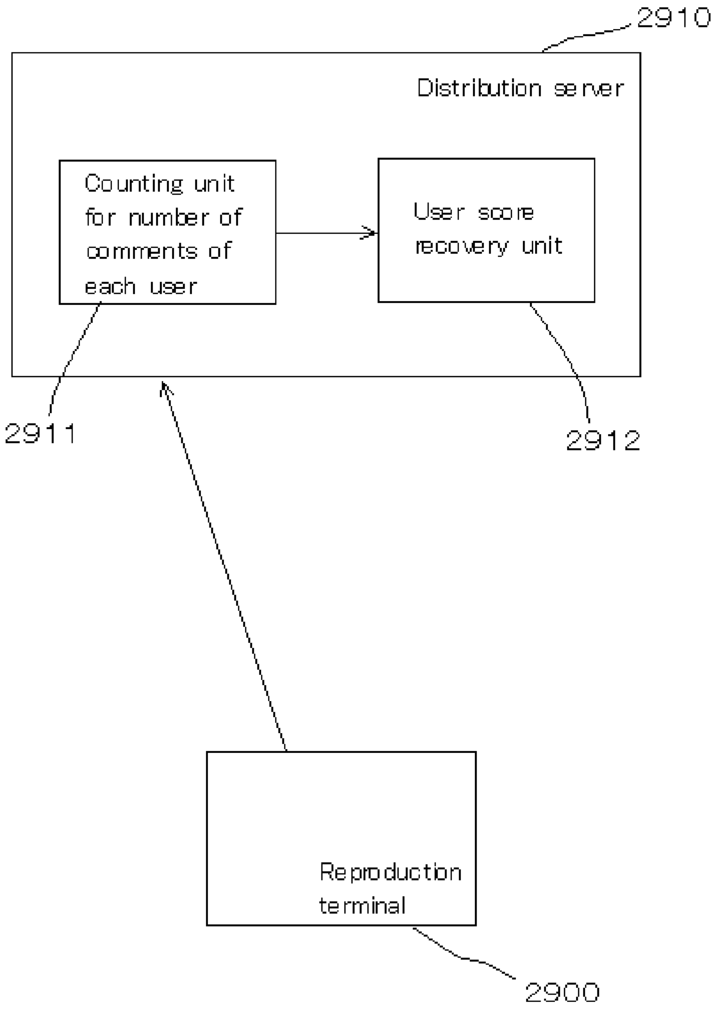
FIG. 29 is a functional block diagram of a comment distribution system of a tenth embodiment.

FIG. 29 is a functional block diagram of a comment distribution system of a tenth embodiment. As shown in FIG. 28, the comment distribution system of the tenth embodiment is on the basis of the third embodiment, and comprises a 'reproduction terminal' (2900), and a 'distribution server' (2910).

The reproduction terminal comprises a 'inappropriate comment user registration unit', a 'inappropriate comment user notification unit', a 'score acquisition unit', a 'second determination unit', a 'comment entry reception unit' and a 'comment information transmitter', and these components are the same as those of the above embodiment, so that descriptions and figures are omitted. The distribution server comprises a 'inappropriate comment user ID receiver', a 'second calculation unit', and a 'comment information distribution unit, a 'user score storage', a 'comment information receiver', a 'score addition unit', and a 'user score calculation unit', and these components are the same as those of the above embodiment, so that descriptions and figures are omitted.

Moreover, on the basis of the ninth embodiment, the 'storage section for user score of each movie', the 'reception section for user ID of each movie', and the 'calculation section for user score of each movie', which are no shown in figures, and other components in other embodiments may be comprised.

In the comment distribution system of the tenth embodiment, the distribution server further comprises a 'counting unit for number of comments of each user' (2911), and a 'user score recovery unit' (2912).

The 'counting unit for number of comments of each user' (2911) has a function of counting number of comment information received by the comment information receiver with respect to each user, and can be implemented, for example, by a communication circuit for connecting to the internet etc, a CPU, a main memory, and a counting program for number of comments of each user.

Specifically, when receiving the transmitted comment correlated with the user ID of comment user, the number of count, correlated with the user ID, and stored, is increased by 1.

Moreover, for example, it is possible to determine whether the comment has the same content, and the count is not executed for the comment of the same content, or when receiving comments from the one user at quite-short intervals (i.e., receiving repeated comment entry), it is possible to count only the first comment. Moreover, in the case of positive-rating registration in contrast to the inappropriate registration, it is possible to weight the number of counts for the user, who enters many comments of positive-rating registration.

The 'user score recovery unit' (2912) has a function of increasing the user score stored in the user score storage according to the number of counts of each user, and can be implemented, for example, by a communication circuit for connecting to the internet etc, a CPU, a main memory, and a user score recovery program.

Note that the terms 'according to the number of counts of each user' means that the recovery processing of the user score is executed according to the number of counts of each user, and the usage of the user score is not limited. For example, it is possible to the recovery of user score is executed when the number of counts of each user is more than or equal to a predetermined value, (e.g. a recovery process where the user score is recovered up to a default value without exception regardless of the current user score, a recovery process where a predetermined value 20 is added to the current user score up to the upper limit, or a recovery process where 50% of the reduction is added to the current user score up to the upper limit). Moreover, for example, it is possible to determine a recovery amount (a value added to the user score) with respect to each user in proportion to the number of counts of each user at a predetermined recovery timing such as the end of each day (e.g., at 23:59:59), thereby recovering the user score by the determined amount. In this case, the number of counts of each user may be reset to 0 after the recovery.

Thus, for the user, who enters many comments and has many chances of score reductions, it is possible to provide the user with more chances of recovering the user score.

Processing Flow of Tenth Embodiment

Figure 30:
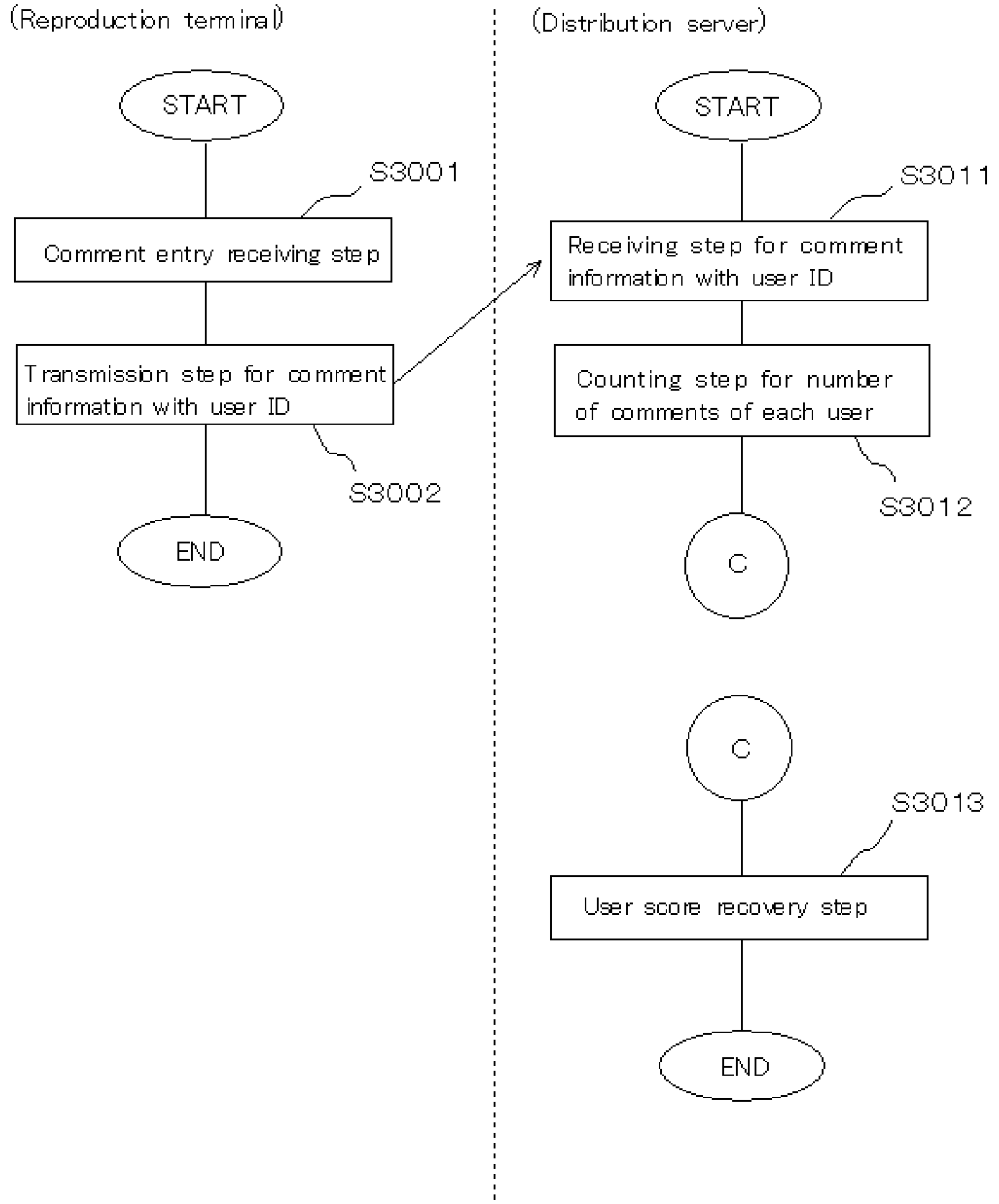
FIG. 30 is a flowchart of the comment distribution system of the tenth embodiment.

FIG. 30 is a flowchart of the comment distribution system of the tenth embodiment. Hereinafter, only characteristic process of this embodiment will be described. Note that, the following step may be executed by the respective hardware configurations of a computer as above, or may configure a program, which is stored in a medium and is for controlling the computer.

As shown in FIG. 30, at the outset, the reproduction terminal is provided with the comment entry field etc. in the window, where the movie is currently reproduced, and receives the entry of the comment information for the distributed movie information (step S3001). Subsequently, the received comment information with the comment user ID is transmitted to the distribution server (step S3002).

Subsequently, the distribution server receives the comment user ID and the comment information (step S3011), and increases the current number of counts of the user ID by '1' (step S3012).

After that, for example, when the number of counts is more than or equal to a predetermined value, the user score is recovered up to a default value, or a recovery amount is determined with respect to each user according to the number of counts at a predetermined recovery timing, thereby recovering the user score by the determined amount. Therefore, the user score stored in the user score storage is increased according to the number of counts of each user (step S3013). Moreover, the number of counts of each user may be reset after the recovery.

Effects of Tenth Embodiment

According to the stage production system of the tenth embodiment, for the user, who enters many comments and has many chances of score reductions, it is possible to provide the user with more chances of recovering the user score. Therefore, it is possible to calculate the comment score according to the inappropriate registration without making the user lose his incentive to enter many comments.

DESCRIPTION OF REFERENCE NUMERALS

0200 Reproduction terminal
0201 Inappropriate word registration unit
0202 Inappropriate word notification unit
0203 Score acquisition unit
0204 Determination unit
0210 Distribution server
0211 Inappropriate word receiver
0212 Calculation unit
0213 Comment information distribution unit

What is claimed is:

1. A comment distribution system, that is configured to execute processes by a processor and that distributes video information and comment information associated with the video information to a plurality of reproduction terminals used by a plurality of users, respectively, the comment information including an initial comment score, the system comprising:

an inappropriate word registration unit configured to register the comment information as an inappropriate word when one of the plurality of users designates the comment information as the inappropriate word;

a calculation unit configured to calculate a new first comment score for a first comment that is obtained by changing the initial comment score for the first comment based on a number of the plurality of users who designate the comment information for the first comment as the inappropriate word;

a comment information distribution unit configured to distribute the comment information associated with the new first comment score for the first comment; and a determination unit configured to determine whether the comment information associated with the new first comment score for the first comment is reproduced by each of the plurality of reproduction terminals based on a threshold value of the new first comment score set by each of the plurality of users, the threshold value being stored in each of the plurality of reproduction terminals, wherein each of the plurality of reproduction terminals has the determination unit, the threshold value, which is stored in one of the plurality of reproduction terminals, is changed to a different threshold value by one of the plurality of users, who uses the one of the plurality of reproduction terminals, the plurality of users has a first user, the first comment is made by the first user at a first predetermined time, and a second comment is made by the first user at a second predetermined time, when a difference between the first and second predetermined times is within a predetermined period, the calculation unit is configured to calculate a new second comment score for the second comment that is obtained by changing the initial comment score for the second comment based on the number of the plurality of users who designate the comment information for the first comment as the inappropriate word, when the difference between the first and second predetermined times is within the predetermined period, the determination unit is configured to determine whether the comment information associated with the new second comment score for the second comment is reproductive by each of the plurality of reproduction terminals based on the threshold value, and when the difference between the first and second predetermined times is in an outside of the predetermined period, the calculation unit is configured to maintain the initial score of the second comment so that the determination unit is configured to determine whether the comment information associated with the initial comment score for the second comment is reproduced by each of the plurality of reproduction terminals based on the threshold value.

2. The comment distribution system according to claim 1, further comprising:

a comment entry reception unit configured to receive the comment information entered by the plurality of users via the plurality of reproduction terminals;

a user score storage configured to store a user ID of each of the plurality of users, an initial user score being associated with each of the user IDs;

a score addition unit configured to add the initial user score to the comment information received by the comment entry reception unit; and a user score calculation unit configured to calculate a new first user score for the first user that is obtained by changing the initial user score for the first user based on the number of the plurality of users who designate the comment information associated with the user ID for the first user as the inappropriate word.

3. The comment distribution system according to claim 2, wherein the user score storage is configured to store the user ID and the new first user score, and the new first user score corresponds to each of the video information, wherein the inappropriate word registration unit is configured to acquire the user ID who enters the comment information associated with the inappropriate word corresponding to each of the video information, and wherein the user score calculation unit is configured to calculate the new first user score corresponding to each of the video information.

4. The comment distribution system according to claim 2, further comprising:

a counting unit configured to count a number of the comment information received by the comment entry reception unit with respect to each of the plurality of users; and a user score recovery unit configured to change the initial user score stored in the user score storage according to the number of the comment information with respect to the each of the plurality of users.

5. The comment distribution system according to claim 2, wherein the user score calculation unit is configures to calculate a new second user score for a second user that is obtained by changing the initial user score for the second user when the comment information entered by the second user contains the comment information including the inappropriate word entered by the first user.

6. The comment distribution system according to claim 1, further comprising:

an inappropriate user ID acquisition unit configured to acquire a user ID of each of the plurality of users who enters the comment information including the inappropriate word designated by the inappropriate word registration unit as an inappropriate user ID;

a user classification storage configured to store the inappropriate user ID and a user classification identified by the inappropriate user ID; and a user classification acquisition unit configured to acquire the stored user classification of the inappropriate user ID associated with the inappropriate word, wherein the calculation unit is configured to calculate the new first comment score associated with the inappropriate user ID that is obtained by changing the initial comment score based on the acquired user classification.

7. The comment distribution system according to claim 1, wherein the video information has attribute information thereof, and the attribute information is one of a category, a producer, a cast, a production year, a production location, and a viewer age limitation of the video information, and the threshold value is changed to the different threshold value by the one of the plurality of users depending on the attribute information.

8. The comment distribution system according to claim 7, wherein the threshold value has a plurality of threshold values, and each of the plurality of threshold values corresponds to each of the attribute information including the category, the producer, the cast, the production year, the production location, and the viewer age limitation of the video information, and the determination unit is configured to obtain one of the plurality of threshold values corresponding to one of the attribute information of the video information which the one of the plurality of users watches.

9. A comment distribution system, that is configured to execute processes by a processor and that distributes video information and comment information associated with the video information to a plurality of reproduction terminals used by a plurality of users, respectively, the comment information including an initial comment score, each of the plurality of users having a user ID, the system comprising:

an inappropriate comment user registration unit configured to register the user ID of a first user of the plurality of users who makes the comment information including a first comment as an inappropriate comment user ID when a second user of the plurality of users designates the comment information including the first comment made by the first user as an inappropriate word;

a calculation unit configured to calculate a new first comment score for the first comment that is obtained by changing the initial comment score for the first comment based on a number of the inappropriate comment user ID;

a comment information distribution unit configured to distribute the comment information associated with the new first comment score for the first comment; and a determination unit configured to determine whether the comment information associated with the new first comment score for the first comment is reproduced by each of the plurality of reproduction terminals based on a threshold value of the new first comment score set by each of the plurality of users, the threshold value being stored in each of the plurality of reproduction terminals, wherein each of the plurality of reproduction terminals has the determination unit, the threshold value, which is stored in one of the plurality of reproduction terminals, is changed to a different threshold value by one of the plurality of users, who uses the one of the plurality of reproduction terminals, the first comment is made at a first predetermined time, and a second comment is made by the first user at a second predetermined time, when a difference between the first and second predetermined times is within a predetermined period, the calculation unit is configured to calculate a new second comment score for the second comment that is obtained by changing the initial comment score for the second comment based on the number of the plurality of users who designate the comment information for the first comment as the inappropriate word, when the difference between the first and second predetermined times is within the predetermined period, the determination unit is configured to determine whether the comment information associated with the new second comment score for the second comment is reproduced by each of the plurality of reproduction terminals based on the threshold value, and when the difference between the first and second predetermined times is in an outside of the predetermined period, the calculation unit is configured to maintain the initial score of the second comment so that the determination unit is configured to determine whether the comment information associated with the initial comment score for the second comment is reproduced by each of the plurality of reproduction terminals based on the threshold value.

10. The comment distribution system according to claim 9, comprising:

a comment entry reception unit configured to receive the comment information entered by the plurality of users via the plurality of reproduction terminals;

a user score storage configured to store the user ID of each of the plurality of users and an initial user score associated with each of the user IDs;

a score addition unit configured to add the initial user score to the comment information received by the comment entry reception unit; and a user score calculation unit configured to calculate a new first user score for the first user that is obtained by changing the initial user score for the first user based on the number of the plurality of users who designate the comment information associated with the user ID for the first user as the inappropriate word.

11. The comment distribution system according to claim 10, wherein the user score storage is configured to store the user ID and new user scores for the plurality of users, and the new user scores correspond to each of the video information, wherein the inappropriate comment user registration unit is configured to acquire the user ID who enters the comment information associated with the inappropriate word corresponding to each of the video information, and wherein the user score calculation unit is configured to calculate the new user scores corresponding to each of the video information.

12. The comment distribution system according to claim 10, further comprising:

a counting unit configured to count a number of the comment information received by the comment entry reception unit with respect to each of the plurality of users; and a user score recovery unit configured to change the initial user score stored in the user score storage according to the number of the comment information with respect to the each of the plurality of users.

13. The comment distribution system according to claim 10, further comprising:

an inappropriate word registration unit configured to register the comment information as the inappropriate word when one of the plurality of users designates the comment information as the inappropriate word; and wherein the user score calculation unit is configures to calculate a new second user score for the second user that is obtained by changing the initial user score for the second user when the comment information entered by the second user contains the comment information including the inappropriate word entered by the first user.

14. The comment distribution system according to claim 10, wherein the user score calculation unit is configured to calculate a new second user score for the second user that is obtained by changing the initial user score for the second user when a third comment is entered by the second user the predetermined period.

15. The comment distribution system according to claim 9, further comprising:

an inappropriate user ID acquisition unit configured to acquire the user ID of each of the plurality of users who enters the comment information including the inappropriate word designated by the inappropriate comment user registration unit as an inappropriate user ID;

a user classification storage configured to store the inappropriate user ID and a user classification identified by the inappropriate user ID; and a user classification acquisition unit configured to acquire the stored user classification of the inappropriate user ID associated with the inappropriate word, wherein the calculation unit is configured to calculate the comment new score associated with the inappropriate user ID that is obtained by changing the initial comment score based on the acquired user classification.

16. The comment distribution system according to claim 9, wherein the video information has attribute information thereof, and the attribute information is one of a category, a producer, a cast, a production year, a production location, and a viewer age limitation of the video information, and the threshold value is changed to the different threshold value by the one of the plurality of users depending on the attribute information.

17. The comment distribution system according to claim 16, wherein the threshold value has a plurality of threshold values, and each of the plurality of threshold values corresponds to each of the attribute information including the category, the producer, the cast, the production year, the production location, and the viewer age limitation of the video information, and the determination unit is configured to obtain one of the plurality of threshold values corresponding to one of the attribute information of the video information which the one of the plurality of users watches.

18. A method for operating a comment distribution system, the method distributing video information and comment information associated with the video information to a plurality of reproduction terminals used by a plurality of users, respectively, the comment information including an initial comment score, the method causing a computer to execute a process, the method comprising:

registering the comment information as an inappropriate word when one of the plurality of users designates the comment information as the inappropriate word;

calculating a new first comment score for a first comment that is obtained by changing the initial comment score for the first comment based on a number of the plurality of users who designate the comment information for the first comment as the inappropriate word;

distributing the comment information associated with the new first comment score for the first comment; and determining whether the comment information associated with the new first comment score for the first comment is reproduced by each of the plurality of reproduction terminals based on a threshold value of the new first comment score set by each of the plurality of users, the threshold value being stored in each of the plurality of reproduction terminals, wherein the determining is performed in each of the plurality of reproduction terminals, the threshold value, which is stored in one of the plurality of reproduction terminals, is changed to a different threshold value by one of the plurality of users, who uses the one of the plurality of reproduction terminals, the plurality of users has a first user, the first comment is made by the first user at a first predetermined time, and a second comment is made by the first user at a second predetermined time, when a difference between the first and second predetermined times is within a predetermined period, a new second comment score for the second comment is calculated by chancing the initial comment score for the second comment based on the number of the plurality of users who designate the comment information for the first comment as the inappropriate word, when the difference between the first and second predetermined times is within the predetermined period, it is determined whether the comment information associated with the new second comment score for the second comment is reproduced by each of the plurality of reproduction terminals based on the threshold value, and when the difference between the first and second predetermined times is in an outside of the predetermined period, the initial score of the second comment is maintained so that it is determined whether the comment information associated with the initial comment score for the second comment is reproduced by each of the plurality of reproduction terminals based on the threshold value.

19. The method for operating a comment distribution system according to claim 18, wherein the video information has attribute information thereof, and the attribute information is one of a category, a producer, a cast, a production year, a production location, and a viewer age limitation of the video information, and the threshold value is changed to the different threshold value by the one of the plurality of users depending on the attribute information.

20. The method for operating a comment distribution system according to claim 19, wherein the threshold value has a plurality of threshold values, and each of the plurality of threshold values corresponds to each of the attribute information including the category, the producer, the cast, the production year, the production location, and the viewer age limitation of the video information, and the determining obtains one of the plurality of threshold values corresponding to one of the attribute information of the video information which the one of the plurality of users watches.

21. A non-transitory computer-readable storage medium storing a program for causing a computer to execute a process of operating a comment distribution system that distributes video information and comment information associated with the video information to a plurality of reproduction terminals used by a plurality of users, respectively, the comment information including an initial comment score, that when execution on a processor, perform the step of:

registering the comment information as an inappropriate word when one of the plurality of users designates the comment information as the inappropriate word;

calculating a new first comment score for the first comment that is obtained by changing the initial comment score for the first comment based on a number of the plurality of users who designate the comment information far the first comment as the inappropriate word;

distributing the comment information associated with the new first comment score for the first comment; and determining whether the comment information associated with the new first comment score for the first comment is reproduced by each of the plurality of reproduction terminals based on a threshold value of the new first comment score set by each of the plurality of users, the threshold value being stored in each of the plurality of reproduction terminals, wherein the determining is executed in each of the plurality of reproduction terminals, the threshold value, which is stored in one of the plurality of reproduction terminals, is changed to a different threshold value by one of the plurality of users, who uses the one of the plurality of reproduction terminals, the plurality of users has a first user, the first comment is made by the first user at a first predetermined time, and a second comment is made by the first user at a second predetermined time, when a difference between the first and second predetermined times is within a predetermined period, a new second comment score for the second comment is calculated by changing the initial comment score for the second comment based on the number of the plurality of users who designate the comment information for the first comment as the inappropriate word, when the difference between the first and second predetermined times is within the predetermined period, it is determined whether the comment information associated with the new second comment score for the second comment is reproduced by each of the plurality of reproduction terminals based on the threshold value, and when the difference between the first and second predetermined times is in an outside of the predetermined period, the initial score of the second comment is maintained so that it is determined whether the comment information associated with the initial comment score for the second comment is reproduced by each of the plurality of reproduction terminals based on the threshold value.

22. The non-transitory computer-readable storage medium according to claim 21, wherein the video information has attribute information thereof, and the attribute information is one of a category, a producer, a cast, a production year, a production location, and a viewer age limitation of the video information, and the threshold value is changed to the different threshold value by the one of the plurality of users depending on the attribute information.

23. The non-transitory computer-readable storage medium according to claim 22, wherein the threshold value has a plurality of threshold values, and each of the plurality of threshold values corresponds to each of the attribute information including the category, the producer, the cast, the production year, the production location, and the viewer age limitation of the video information, and the determining obtains one of the plurality of threshold values corresponding to one of the attribute information of the video information which the one of the plurality of users watches.

* * * * *